US012090348B2

(12) United States Patent
Choi et al.

(10) Patent No.: US 12,090,348 B2
(45) Date of Patent: Sep. 17, 2024

(54) MASK APPARATUS

(71) Applicant: LG Electronics Inc., Seoul (KR)

(72) Inventors: Chiyoung Choi, Seoul (KR); Hojung Kim, Seoul (KR); Keonwang Lee, Seoul (KR); Taejun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 856 days.

(21) Appl. No.: 17/121,056

(22) Filed: Dec. 14, 2020

(65) Prior Publication Data

US 2021/0379415 A1 Dec. 9, 2021

(30) Foreign Application Priority Data

Jun. 5, 2020 (KR) ........................ 10-2020-0068400

(51) Int. Cl.
*A62B 18/00* (2006.01)
*A62B 7/10* (2006.01)
(Continued)

(52) U.S. Cl.
CPC .............. *A62B 18/006* (2013.01); *A62B 7/10* (2013.01); *A62B 7/12* (2013.01); *A62B 9/00* (2013.01);
(Continued)

(58) Field of Classification Search
CPC ................ A41D 13/11; A41D 13/1176; A41D 13/1146; A62B 18/006; A62B 18/04;
(Continued)

(56) References Cited

U.S. PATENT DOCUMENTS 4,546,793 A 10/1985 Stupecky
4,646,732 A 3/1987 Chien
(Continued)

FOREIGN PATENT DOCUMENTS

CN 1455270 11/2003
CN 103505788 1/2014
(Continued)

OTHER PUBLICATIONS

Office Action in U.S. Appl. No. 17/178,103, mailed on Jun. 30, 2023, 30 pages.
(Continued)

*Primary Examiner* — Joseph D. Boecker
*Assistant Examiner* — Thomas W Greig
(74) *Attorney, Agent, or Firm* — Fish & Richardson P.C.

(57) ABSTRACT

A mask apparatus includes a mask body including an air duct and a fan module mounting portion disposed at a suction-side of the air duct, a fan module disposed at the fan module mounting portion, and a mask body cover that is coupled to the front surface of the mask body and covers the fan module and the air duct. The mask body cover defines an air suction hole configured to communicate air with a fan inlet, and the fan module has a first end inserted into the air duct and a second end coupled to the mask body. The fan module mounting portion includes a fan module coupling portion that protrudes from the front surface of the mask body and that couples the second end of the fan module to the mask body.

20 Claims, 12 Drawing Sheets

(51) Int. Cl.

| | |
|---|---|
| ***A62B 7/12*** | (2006.01) |
| ***A62B 9/00*** | (2006.01) |
| ***A62B 9/04*** | (2006.01) |
| ***A62B 18/02*** | (2006.01) |
| ***A62B 18/08*** | (2006.01) |
| ***A62B 23/02*** | (2006.01) |
| ***F04D 29/40*** | (2006.01) |
| ***F04D 29/70*** | (2006.01) |

(52) U.S. Cl.
CPC .............. *A62B 9/04* (2013.01); *A62B 18/025* (2013.01); *A62B 18/08* (2013.01); *A62B 23/02* (2013.01); *F04D 29/403* (2013.01); *F04D 29/701* (2013.01)

(58) Field of Classification Search
CPC ................ A62B 18/003; A62B 18/045; A62B 18/025; A62B 18/008
See application file for complete search history.

(56) References Cited

U.S. PATENT DOCUMENTS

| | | | | |
|---|---|---|---|---|
| 5,062,421 | A | 11/1991 | Burns et al. | |
| 5,372,130 | A * | 12/1994 | Stern .................... | A62B 18/006 128/206.17 |
| 5,782,234 | A | 7/1998 | Bates | |
| 6,213,119 | B1 | 4/2001 | Brydon et al. | |
| 6,543,450 | B1 | 4/2003 | Flynn | |
| 8,667,959 | B2 * | 3/2014 | Tilley .................. | A62B 18/006 128/205.12 |
| 10,226,542 | B2 | 3/2019 | Messina et al. | |
| 10,342,999 | B2 | 7/2019 | Song et al. | |
| 10,661,104 | B2 | 5/2020 | Morgan et al. | |
| 11,241,594 | B2 | 2/2022 | Szasz et al. | |
| 2003/0052279 | A1 | 3/2003 | Kikuchi | |
| 2003/0066257 | A1 | 4/2003 | Shovlin | |
| 2003/0066527 | A1 | 4/2003 | Chen | |
| 2005/0145249 | A1 | 7/2005 | Solyntjes et al. | |
| 2006/0076012 | A1 * | 4/2006 | Tanizawa ............. | A62B 18/006 128/206.16 |
| 2007/0125385 | A1 | 6/2007 | Ho et al. | |
| 2009/0320847 | A1 | 12/2009 | Bozanic et al. | |
| 2010/0101575 | A1 * | 4/2010 | Fedorko .................. | A62B 9/04 128/205.24 |
| 2010/0224190 | A1 | 9/2010 | Tilley et al. | |
| 2010/0313892 | A1 | 12/2010 | Shigematsu et al. | |
| 2010/0329924 | A1 | 12/2010 | Harris | |
| 2011/0126713 | A1 | 6/2011 | Legare et al. | |
| 2014/0216475 | A1 | 8/2014 | Blomberg et al. | |
| 2014/0360501 | A1 | 12/2014 | Guiducci et al. | |
| 2015/0034080 | A1 | 2/2015 | Furuichi et al. | |
| 2015/0047642 | A1 | 2/2015 | Tucker et al. | |
| 2015/0136142 | A1 | 5/2015 | Blomberg | |
| 2015/0151143 | A1 | 6/2015 | Langford | |
| 2015/0202473 | A1 * | 7/2015 | Curran ................. | A62B 23/025 128/205.27 |
| 2015/0217144 | A1 | 8/2015 | Skov et al. | |
| 2015/0217146 | A1 | 8/2015 | Skov et al. | |
| 2015/0250915 | A1 | 9/2015 | Pugh et al. | |
| 2015/0289598 | A1 | 10/2015 | Hsiung | |
| 2015/0306324 | A1 | 10/2015 | Ayon et al. | |
| 2015/0362478 | A1 | 12/2015 | Phillips | |
| 2016/0001111 | A1 * | 1/2016 | Morgan .................. | A62B 7/10 128/205.12 |
| 2016/0022944 | A1 | 1/2016 | Chodkowski et al. | |
| 2016/0030778 | A1 | 2/2016 | Skov et al. | |
| 2016/0030779 | A1 | 2/2016 | Twu et al. | |
| 2016/0074604 | A1 | 3/2016 | Bronner et al. | |
| 2016/0236016 | A1 | 8/2016 | Ono et al. | |
| 2016/0279450 | A1 | 9/2016 | Goldstein et al. | |
| 2017/0136271 | A1 | 5/2017 | Munster | |
| 2017/0157353 | A1 | 6/2017 | Olsen et al. | |
| 2018/0078798 | A1 * | 3/2018 | Fabian .................. | A62B 18/10 |
| 2018/0177965 | A1 | 6/2018 | Patel | |
| 2018/0185677 | A1 | 7/2018 | Curran et al. | |
| 2018/0236275 | A1 * | 8/2018 | Song ...................... | A62B 18/10 |
| 2018/0318457 | A1 | 11/2018 | Lucio | |
| 2019/0009114 | A1 | 1/2019 | Han | |
| 2019/0113501 | A1 | 4/2019 | Jameson et al. | |
| 2019/0160249 | A1 | 5/2019 | Rose et al. | |
| 2019/0175962 | A1 | 6/2019 | Su et al. | |
| 2019/0275357 | A1 * | 9/2019 | Palmer, Jr. ............. | A61B 5/746 |
| 2020/0008539 | A1 | 1/2020 | Kolasa | |
| 2020/0038614 | A1 * | 2/2020 | Duff ...................... | A61M 16/06 |
| 2020/0086071 | A1 | 3/2020 | Lin et al. | |
| 2020/0087031 | A1 | 3/2020 | Yoo et al. | |
| 2020/0129650 | A1 | 4/2020 | Kim et al. | |
| 2020/0155877 | A1 | 5/2020 | Key et al. | |
| 2021/0228920 | A1 * | 7/2021 | Arigue ................... | A62B 18/10 |
| 2021/0337891 | A1 * | 11/2021 | Shah .................... | A62B 23/025 |
| 2021/0378325 | A1 | 12/2021 | Mun et al. | |
| 2021/0379412 | A1 | 12/2021 | Lee et al. | |
| 2021/0379418 | A1 | 12/2021 | Kim et al. | |
| 2021/0402222 | A1 | 12/2021 | Kwon et al. | |
| 2022/0016449 | A1 | 1/2022 | Choi et al. | |

FOREIGN PATENT DOCUMENTS

| | | | |
|---|---|---|---|
| CN | 103751919 | | 4/2014 |
| CN | 104162236 | | 11/2014 |
| CN | 203943119 | | 11/2014 |
| CN | 104826247 | | 8/2015 |
| CN | 204637356 | | 9/2015 |
| CN | 105126219 | | 12/2015 |
| CN | 105167366 | | 12/2015 |
| CN | 105476118 | | 4/2016 |
| CN | 105495776 | | 4/2016 |
| CN | 105641821 | | 6/2016 |
| CN | 205285072 | | 6/2016 |
| CN | 106039607 | | 10/2016 |
| CN | 106235464 | | 12/2016 |
| CN | 106253937 | | 12/2016 |
| CN | 106730464 | | 5/2017 |
| CN | 106847663 | | 6/2017 |
| CN | 107149182 | | 9/2017 |
| CN | 206459266 | | 9/2017 |
| CN | 107224687 | | 10/2017 |
| CN | 206577264 | | 10/2017 |
| CN | 107308564 | | 11/2017 |
| CN | 107405508 | | 11/2017 |
| CN | 107735148 | | 2/2018 |
| CN | 206995630 | | 2/2018 |
| CN | 207011751 | | 2/2018 |
| CN | 207040968 | | 2/2018 |
| CN | 207041756 | | 2/2018 |
| CN | 207041756 | U * | 2/2018 |
| CN | 207152901 | | 3/2018 |
| CN | 207604526 | | 7/2018 |
| CN | 207721249 | | 8/2018 |
| CN | 207836817 | | 9/2018 |
| CN | 108635689 | | 10/2018 |
| CN | 208145256 | | 11/2018 |
| CN | 109078277 | | 12/2018 |
| CN | 208403333 | | 1/2019 |
| CN | 208611622 | | 3/2019 |
| CN | 208694061 | | 4/2019 |
| CN | 109924568 | | 6/2019 |
| CN | 111135492 | | 5/2020 |
| CN | 111565763 | | 8/2020 |
| EP | 0558147 | | 9/1993 |
| EP | 0621056 | | 10/1994 |
| EP | 2913083 | | 9/2015 |
| EP | 3446755 | | 2/2019 |
| EP | 3446756 | | 2/2019 |
| GB | 1155046 | | 6/1969 |
| JP | H05137808 | | 6/1993 |
| JP | 3039303 | | 7/1997 |
| JP | H09225012 | | 9/1997 |
| JP | 10066817 | | 3/1998 |
| JP | H10165527 | | 6/1998 |
| JP | 3077655 | | 5/2001 |
| JP | 2003322712 | | 11/2003 |

(56) References Cited

FOREIGN PATENT DOCUMENTS

| | | | |
|---|---|---|---|
| JP | 2004364177 | | 12/2004 |
| JP | 3117209 | U | 1/2006 |
| JP | 2007236600 | | 9/2007 |
| JP | 2011078604 | | 4/2011 |
| JP | 2011078678 | | 4/2011 |
| JP | 2011115449 | | 6/2011 |
| JP | 2012-075793 | | 4/2012 |
| JP | 2013127129 | | 6/2013 |
| JP | 3196218 | | 2/2015 |
| JP | 2015093036 | | 5/2015 |
| JP | 2015-524337 | | 8/2015 |
| JP | 2015527130 | | 9/2015 |
| JP | 2016087376 | | 5/2016 |
| JP | 2018000982 | | 1/2018 |
| JP | 2018033905 | | 3/2018 |
| JP | 2018089158 | | 6/2018 |
| JP | 2018-146805 | | 9/2018 |
| JP | 2019501721 | | 1/2019 |
| KR | 10-1989-0000137 | | 3/1989 |
| KR | 10-1995-0008732 | | 8/1995 |
| KR | 20050061384 | | 6/2005 |
| KR | 20100081991 | | 7/2010 |
| KR | 20-2010-0009804 | | 10/2010 |
| KR | 1020110067854 | | 6/2011 |
| KR | 20120051735 | | 5/2012 |
| KR | 200461294 | | 7/2012 |
| KR | 101228403 | | 1/2013 |
| KR | 101536265 | | 7/2015 |
| KR | 101554664 | | 9/2015 |
| KR | 101619487 | | 5/2016 |
| KR | 20160062808 | | 6/2016 |
| KR | 20160129562 | | 11/2016 |
| KR | 20160132159 | | 11/2016 |
| KR | 101733470 | | 5/2017 |
| KR | 20170111132 | | 10/2017 |
| KR | 20170126163 | | 11/2017 |
| KR | 20180009326 | | 1/2018 |
| KR | 1020180009326 | | 1/2018 |
| KR | 10-2018-0012496 | | 2/2018 |
| KR | 101827016 | | 2/2018 |
| KR | 1020180027561 | | 3/2018 |
| KR | 101849610 | | 4/2018 |
| KR | 20180043234 | | 4/2018 |
| KR | 20180045934 | | 5/2018 |
| KR | 20180064284 | | 6/2018 |
| KR | 20180091698 | | 8/2018 |
| KR | 20180128040 | | 11/2018 |
| KR | 10-2018-0130658 | | 12/2018 |
| KR | 101925388 | | 12/2018 |
| KR | 1020180135840 | | 12/2018 |
| KR | 10-1942785 | | 1/2019 |
| KR | 101942785 | B1 * | 1/2019 |
| KR | 20190033299 | | 3/2019 |
| KR | 1020190033299 | | 3/2019 |
| KR | 10-2019-0053757 | | 5/2019 |
| KR | 10-2019-0022668 | | 6/2019 |
| KR | 102002878 | | 7/2019 |
| KR | 1020190089188 | | 7/2019 |
| KR | 1020190096496 | | 8/2019 |
| KR | 102023974 | | 9/2019 |
| KR | 10-2019-0119804 | | 10/2019 |
| KR | 101997813 | | 10/2019 |
| KR | 102065360 | | 2/2020 |
| KR | 1020200033495 | | 3/2020 |
| KR | 102110687 | | 5/2020 |
| KR | 20200048502 | | 5/2020 |
| KR | 1020200048502 | | 5/2020 |
| KR | 1020200049490 | | 5/2020 |
| KR | 1020200079925 | | 7/2020 |
| TW | 201201879 | | 1/2012 |
| TW | M555232 | | 2/2018 |
| TW | 201904614 | | 2/2019 |
| WO | WO 1996/22124 | | 7/1996 |
| WO | WO2009067583 | | 5/2009 |
| WO | WO2010070495 | | 6/2010 |
| WO | WO2014020469 | | 2/2014 |
| WO | WO 2016/072868 | | 5/2016 |
| WO | WO2016157159 | | 10/2016 |
| WO | WO20170004313 | | 1/2017 |
| WO | WO2017116174 | | 7/2017 |
| WO | WO2018036902 | | 3/2018 |
| WO | WO2018147941 | | 8/2018 |
| WO | WO 2019/059699 | | 3/2019 |
| WO | WO2020055106 | | 3/2020 |
| WO | WO2020094850 | | 5/2020 |

OTHER PUBLICATIONS

Notice of Allowance in U.S. Appl. No. 17/178,103, mailed on Nov. 3, 2023, 12 pages.

Office Action in Korean Appln. No. 10-2022-0126062, mailed on Sep. 26, 2023, 8 pages (with English translation).

Office Action in U.S. Appl. No. 17/112,500, mailed on Nov. 28, 2023, 14 pages.

Office Action in U.S. Appl. No. 17/230,206, mailed on Oct. 12, 2023, 19 pages.

Office Action in U.S. Appl. No. 17/231,472, mailed on Oct. 23, 2023, 19 pages.

Office Action in U.S. Appl. No. 17/244,683, mailed on Oct. 13, 2023, 21 pages.

Extended European Search Report in European Appln. No. 20217535.2, dated Jun. 22, 2021, 4 pages.

Extended European Search Report in European Appln. No.20217537.8, dated Jun. 22, 2021, 4 pages.

Office Action in Korean Appln. No. 10-2020-0068404, dated Jun. 30, 2021, 12 pages (with English translation).

Office Action in Korean Appln. No. 10-2020-0068611, dated Jun. 30, 2021, 12 pages (with English translation).

Office Action in Taiwanese Appln. No. 109146705, dated Jul. 7, 2021, 19 pages (with English translation).

Office Action in Taiwanese Appln. No. 110102539, dated Jul. 12, 2021, 10 pages (with English translation).

Office Action in Taiwanese Appln. No. 110102540, dated Jul. 12, 2021, 19 pages (with English translation).

Office Action in Taiwanese Appln. No. 110105039, dated Jul. 12, 2021, 15 pages (with English translation).

Office Action in Chinese Appln. No. 202011403700.7, dated May 4, 2023, 18 pages (with English translation).

Office Action in Chinese Appln. No. 202110096186.5, mailed on Jun. 3, 2023, 16 pages (with English translation).

Office Action in U.S. Appl. No. 17/230,206, dated Jun. 22, 2023, 18 pages.

Office Action in U.S. Appl. No. 17/231,472, dated Jun. 23, 2023, 23 pages.

Extended European Search Report in European Appln. No. 20217533.7, dated Jun. 8, 2021, 5 pages.

Korean Office Action in Korean Appln. No. 10-2020-0068404, dated Feb. 5, 2021, 11 pages (with English translation).

Korean Office Action in Korean Appln. No. 10-2020-0068407, dated Feb. 5, 2021, 11 pages (with English translation).

Korean Office Action in Korean Appln. No. 10-2020-0068611, dated Feb. 5, 2021, 11 pages (with English translation).

Korean Office Action in Korean Appln. No. 10-2020-0109160, dated Dec. 11, 2020, 21 pages (with English translation).

Korean Office Action in Korean Appln. No. 2020-0068402, dated Dec. 15, 2020, 19 pages (with English translation).

Decision to Grant a Patent in Japanese Appln. No. 2021-043251, dated Oct. 25, 2022, 5 pages (with English translation).

Office Action in European Appln. No. 20217533.7, dated Nov. 23, 2022, 5 pages.

Office Action in European Appln. No. 21182279.6, dated Oct. 17, 2022, 2 pages.

Office Action in Taiwanese Appln. No. 110117972, dated Oct. 7, 2022, 14 pages (with English translation).

Office Action in U.S. Appl. No. 17/170,035, dated Sep. 29, 2022, 19 pages.

Written Decision on Registration in Korean Appln. No. 10-2020-0080437, dated Oct. 22, 2022, 11 pages (with English translation).

(56) References Cited

OTHER PUBLICATIONS

Notice of Allowance in Korean Appln. No. 10-2020-0068413, dated May 31, 2022, 4 pages (with English translation).
Notice of Allowance in Korean Appln. No. 10-2020-0080087, dated Jun. 30, 2022, 5 pages (with English translation).
Office Action in Chinese Appln. No. 202011328161.5, dated Apr. 2, 2022, 15 pages (with English translation).
Office Action in Chinese Appln. No. 202110046911.8, dated Apr. 15, 2022, 12 pages (with English translation).
Office Action in Chinese Appln. No. 202110382635.2, dated Apr. 20, 2022, 12 pages (with English translation).
Office Action in Chinese Appln. No. 202110383659.X, dated Apr. 18, 2022, 13 pages (with English translation).
Office Action in Chinese Appln. No. 202110404827.9, dated Apr. 19, 2022, 13 pages (with English translation).
Office Action in Indian Appln. No. 202114011936, dated May 5, 2022, 5 pages.
Office Action in Japapnese Appln. No. 2021-043251, dated May 10, 2022, 6 pages (with English translation).
Office Action in Japapnese Appln. No. 2021-073811, dated May 10, 2022, 6 pages (with English translation).
Office Action in Japapnese Appln. No. 2021-074825, dated Apr. 19, 2022, 6 pages (with English translation).
Office Action in Japapnese Appln. No. 2021-090930, dated Jun. 14, 2022, 10 pages (with English translation).
Notice of Allowance in Japanese Appln. No. 2020-204668, dated Aug. 16, 2022, 5 pages (with English translation).
Office Action in Chinese Appln. No. 202110552518.6, dated Jul. 4, 2022, 18 pages (with English translation).
Extended European Search Report in European Appln. No. 21169773.5, dated Sep. 24, 2021, 4 pages.
Extended European Search Report in European Appln. No. 21169777.6, dated Sep. 24, 2021, 5 pages.
Extended European Search Report in European Appln. No. 21169778.4, dated Oct. 15, 2021, 5 pages.
Extended European Search Report in European Appln. No. 21169793.3, dated Oct. 15, 2021, 4 pages.
Extended European Search Report in European Appln. No. 21169796.6, dated Oct. 18, 2021, 4 pages.
Extended European Search Report in European Appln. No. 21169813.9, dated Oct. 20, 2021, 4 pages.
Extended European Search Report in European Appln. No. 21169817.0, dated Oct. 14, 2021, 4 pages.
Extended European Search Report in European Appln. No. 21170476.2, dated Oct. 13, 2021, 4 pages.
Extended European Search Report in European Appln. No. 21170861.5, dated Oct. 25, 2021, 4 pages.
Office Action in Taiwanese Appln. No. 11120021940, dated Dec. 20, 2020, 11 pages (with English translation).
Notice of Allowance in Korean Appln. No. 10-2020-0068407, dated Nov. 29, 2021, 4 pages (with English translation).
Office Action in Korean Appln. No. 10-2020-0068400, dated Dec. 27, 2021, 13 pages (with English translation).
Office Action in Korean Appln. No. 10-2020-0068412, dated Dec. 27, 2021, 15 pages (with English translation).
Office Action in Korean Appln. No. 10-2020-0080417, dated Dec. 28, 2021, 13 pages (with English translation).
Office Action in Korean Appln. No. 10-2020-0089132, dated Dec. 28, 2021, 13 pages (with English translation).
Office Action in Korean Appln. No. 10-2020-0068413, dated Nov. 17, 2021, 13 pages (with English translation).
Office Action in Korean Appln. No. 10-2020-0080087, dated Nov. 30, 2021, 15 pages (with English translation).
Office Action in Indian Appln. No. 202114007027, dated Jan. 5, 2022, 6 pages.
Office Action in Indian Appln. No. 202114003123, dated Jan. 6, 2022, 5 pages.
Office Action in Indian Appln. No. 202114008985, dated Jan. 12, 2022, 5 pages.
Office Action in Indian Appln. No. 202114003125, dated Jan. 13, 2022, 5 pages.
Office Action in Indian Appln. No. 202114007372, dated Jan. 24, 2022, 6 pages.
Office Action in Japanese Appln. No. 2020-204668, dated Feb. 7, 2022, 12 pages (with English translation).
Office Action in Korean Appln. No. 10-2020-0080437, dated Feb. 21, 2022, 13 pages (with English translation).
Office Action in Korean Appln. No. 10-2020-0068421, dated Jan. 23, 2022, 12 pages (with English translation).
Office Action in Chinese Appln. No. 202011089763, mailed on Feb. 11, 2023, 18 pages (with English translation).
Office Action in Chinese Appln. No. 202011328031, mailed on Feb. 15, 2023, 18 pages (with English translation).
Office Action in Chinese Appln. No. 202110184702, mailed on Mar. 18, 2023, 23 pages (with English translation).
Office Action in Korean Appln. No. 20210129533, mailed on Mar. 28, 2023, 18 pages (with English translation).
Office Action in Korean Appln. No. 20220126062, mailed on Mar. 23, 2023, 23 pages (with English translation).
Office Action in U.S. Appl. No. 17/170,035, mailed on Feb. 8, 2023, 8 pages.
Notice of Allowance in U.S. Appl. No. 17/174,766, mailed on Dec. 5, 2023, 12 pages.
Notice of Allowance in U.S. Appl. No. 17/244,683, mailed on Feb. 8, 2024, 14 pages.
Office Action in Chinese Appln. No. 202110096186.5, mailed on Feb. 9, 2024, 7 pages (with English translation).
Office Action in U.S. Appl. No. 17/121,115, mailed on Dec. 20, 2023, 11 pages.
Office Action in U.S. Appl. No. 17/231,462, mailed on Dec. 28, 2023, 17 pages.
Office Action in U.S. Appl. No. 17/231,472, mailed on Feb. 27, 2024, 20 pages.

* cited by examiner

MASK APPARATUS

CROSS-REFERENCE TO RELATED APPLICATIONS

The present application claims the benefits of priority to Korean Patent Application No. 10-2020-0068400, filed on Jun. 5, 2020, the disclosure of which is incorporated herein by reference in its entireties.

TECHNICAL FIELD

The present disclosure relates to a mask apparatus.

BACKGROUND

A mask is a device that can cover a user's nose and mouth to avoid inhalation of germs and dust or droplet transmission by viruses or bacteria. The mask can be in close contact with the user's face to cover the user's nose and mouth. The mask can filter germs, dust, and the like, which may be contained in the air, and provide the filtered air to the user. Air containing germs and dust can pass through a body of the mask including a filter configured to block the germs and the dust.

In some cases, the mask can cause uncomfortable breathing since air is introduced into the user's nose and mouth and discharged to the outside through the body of the mask. In some cases, a mask can include a motor, a fan, and a filter to help breathing with the mask.

For example, a "functional mask" can include a filter and a blower fan. The blower fan can be fixed to the mask by inserting the blower fan between a front frame and a rear frame.

In some cases, to maintain and repair the blower fan, the front frame and the rear frame may be separated from each other so that the blower fan is separated from the functional mask. As a result, an assembly time of the functional mask can increase.

In some cases, in the process of coupling the blower fan to the front frame and the rear frame, the blower fan can move out of a mounting position, and the front frame and the rear frame may not be properly coupled.

In some cases, where the blower fan is not properly fixed between the front frame and the rear frame, vibration generated from the blower fan may be transmitted to the functional mask through the front frame and the rear frame, which can cause noise due to the vibration of the functional mask.

SUMMARY

The present application describes a mask apparatus.

For example, the present application describes a mask apparatus that can reduce an assembly time of a fan module.

The present application also describes a mask apparatus that can reduce vibration generated in a fan module.

The present application further describes a mask apparatus that included a fan module firmly fixed.

According to one aspect described in this application, a mask apparatus includes a mask body including an air duct disposed at a front surface of the mask body, and a fan module mounting portion disposed at a suction-side of the air duct. The mask apparatus further includes a fan module that is disposed at the fan module mounting portion and defines a fan inlet and a fan outlet that are configured to communicate air with the air duct, and a mask body cover that is coupled to the front surface of the mask body and covers the fan module and the air duct. The mask body cover defines an air suction hole configured to communicate air with the fan inlet, and the fan module has a first end inserted into the air duct and a second end coupled to the mask body. The fan module mounting portion includes a fan module coupling portion that protrudes from the front surface of the mask body and that couples the second end of the fan module to the mask body.

Implementations according to this aspect can include one or more of the following features. For example, the fan module can include a fan, a fan motor configured to drive the fan, and a fan housing that accommodates the fan and the fan motor. The fan inlet can be defined at a front surface of the fan housing, and the fan outlet is defined at a side surface of a first end of the fan housing. In some examples, the air duct can include a fan module insertion hole that receives the first end of the fan housing, and an air outlet configured to discharge air supplied from the fan module insertion hole.

In some examples, the fan housing can include a coupling end that extends from a second end of the fan housing, where the coupling end defines a coupling hole that receives a coupling member to be inserted into the fan module coupling portion. In some examples, the fan module mounting portion can include a pair of fixing portions that protrude from the front surface of the mask body, where the pair of fixing portions support a top surface of the fan module and a bottom surface of the fan module, respectively.

In some implementations, each of the pair of fixing portions can have a rib shape and be configured to guide horizontal sliding movement of the fan module in a direction perpendicular to the fan module insertion hole. The pair of fixing portions can include a first fixing portion that extends along an upper edge of the fan module insertion hole, and a second fixing portion that extends along a lower edge of the fan module insertion hole. In some examples, the fan module coupling portion can be disposed at an end of each of the pair of fixing portions, and defines an inclination surface.

In some implementations, the air duct can include a recess surface that is disposed at an end of the air duct, that faces the first end of the fan housing, and that defines a front portion of the fan module insertion hole. In some examples, the air duct can include a rear surface and an inclination surface that define a rear portion of the fan module insertion hole, the rear surface of the air duct contacting a rear surface of the fan housing. The inclination surface of the air duct can extends along an insertion direction of the fan module toward a center of the fan module insertion hole.

In some implementations, the mask apparatus can include a power module mounting portion disposed at the front surface of the mask body and disposed between the fan module mounting portion and a lateral end of the mask body, and a power module disposed at the power module mounting portion. In some implementations, the mask apparatus can include a cable fixing rib configured to support one or more cables connected to at least one of the fan module or the power module. For example, the cable fixing rib can include a first rib disposed at at least one of the pair of fixing portions, and a second rib disposed at the front surface of the mask body and spaced apart from the first rib and the one of the pair of fixing portions.

In some implementations, the first rib protrudes from the one of the pair of fixing portions in a first direction, and the second rib protrudes from the front surface of the mask body in a second direction crossing the first direction. The first rib and the second rib extend along one direction. In some examples, the air duct can include a front surface portion, a top surface portion that connects an upper end of the front surface portion to the front surface of the mask body, and a bottom surface portion that connects a lower end of the front surface portion to the front surface of the mask body. The front surface portion can include a curved portion that extends from the fan module insertion hole, a flat portion that connects an end of the curved portion to the front surface of the mask body, and an uneven portion disposed at a rear surface of the flat portion.

In some implementations, the mask apparatus can include a seal configured to contact a user's face, and a sealing bracket that fixes the seal to a rear surface of the mask body. In some examples, the mask body defines a cutoff portion at the rear surface of the mask body, where a part of the cutoff portion corresponds to the air outlet. The sealing bracket can include a bracket insertion portion that covers a first area of the cutoff portion, where the air outlet is a second area of the cutoff portion outside the bracket insertion portion.

In some implementations, the mask body cover can include a filter mounting portion that defines the air suction hole and that is recessed from a front surface of the mask body cover. In some examples, the mask apparatus can include a filter configured to be inserted to the filter mounting portion, and a filter cover configured to cover a front opening of the filter mounting portion.

In some examples, each of the air duct and the fan module mounting portion can be disposed at both of left and right sides with respect to a center of the mask body, and each of the filter mounting portion and the filter cover can be disposed at both of left and right sides with respect to a center of the mask body cover. In some examples, the filter cover can include one or more air inlets at a side surface of the filter cover.

In some implementations, the mask apparatus can include a control module disposed at the flat portion of the air duct.

In some implementations, there can be an advantage that the assembly time for mounting the fan module to the mask apparatus is reduced, and the assembly process can be simplified.

In some implementations, where the mask body cover is coupled to the mask body on which the fan module is mounted, the fan module can be in close contact with the mask body by the sealing material, and the vibration of the fan module can be reduced.

In some implementations, where the fan module is configured to move between the plurality of fixing ribs, one side of the fan module can be easily inserted into the fan module insertion portion of the air duct.

In some implementations, where one side of the fan module is inserted into the air duct, the other side of the fan module and the fan module coupling portion can be aligned to facilitate the coupling, thereby facilitating the coupling process.

In some implementations, there can be an advantage of facilitating the maintenance operation on the mask apparatus.

The details of one or more implementations are set forth in the accompanying drawings and the description below. Other features will be apparent from the description and drawings, and from the claims.

DETAILED DESCRIPTION

Hereinafter, one or more implementations of a mask apparatus will be described in detail with reference to the drawings.

Figure 1:
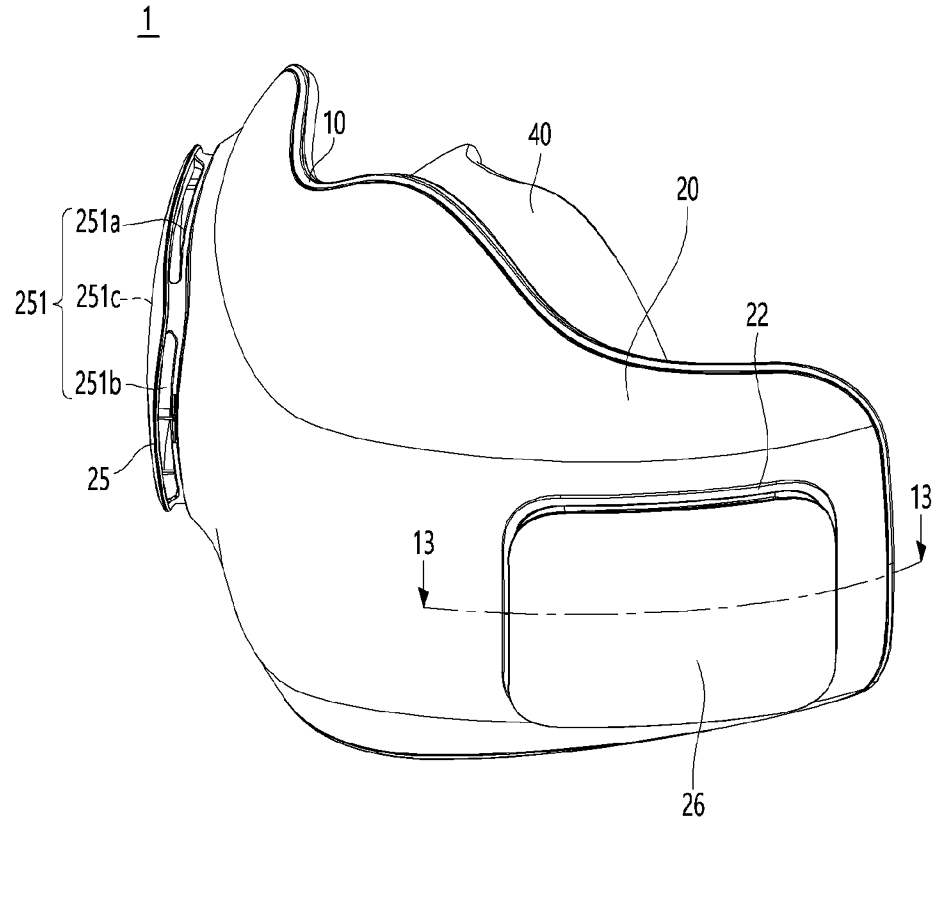
FIG. 1 is a left perspective view showing an example of a mask apparatus.
Figure 2:
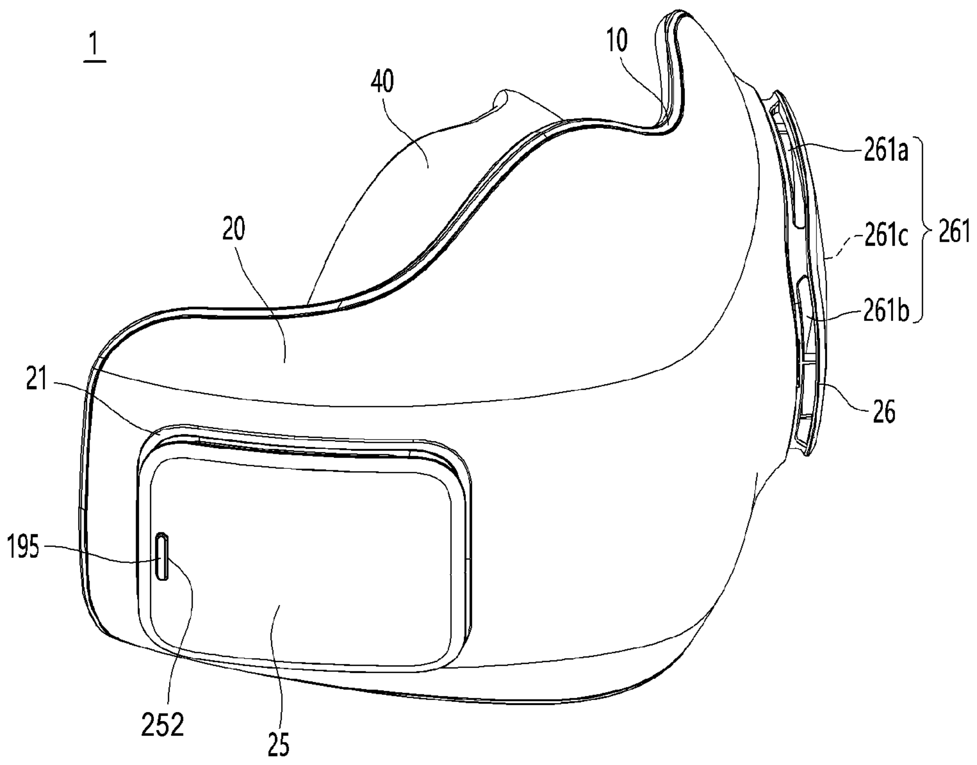
FIG. 2 is a right perspective view showing the mask apparatus.
Figure 3:
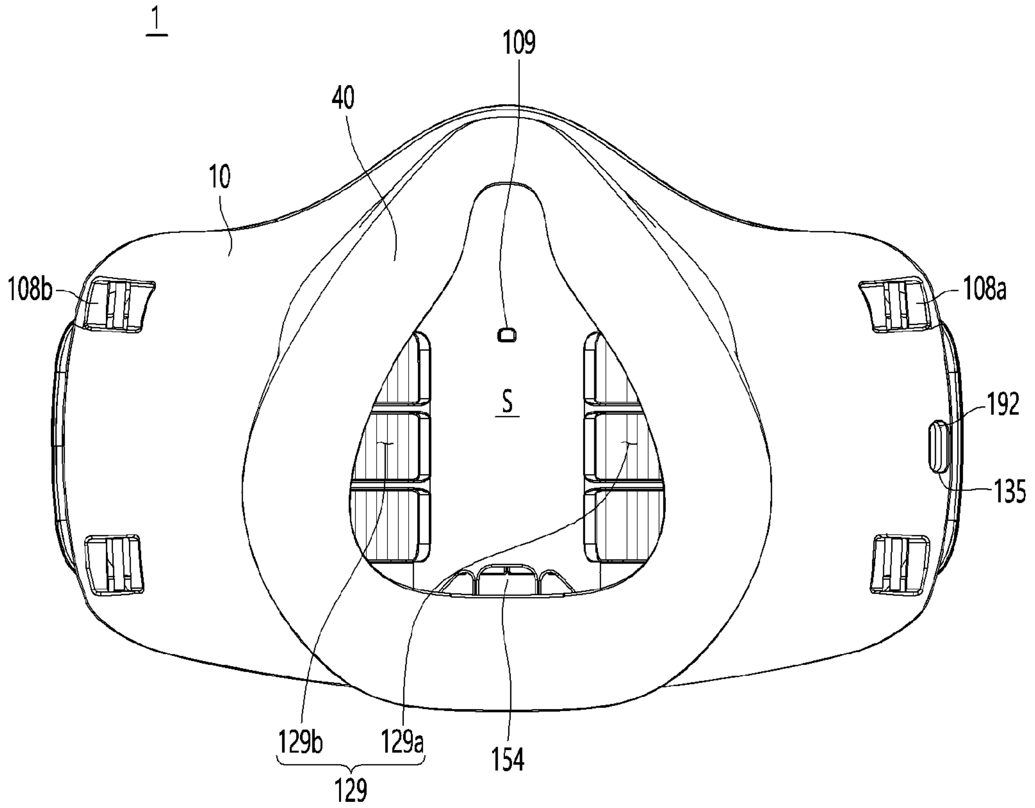
FIG. 3 is a rear view showing the mask apparatus.
Figure 4:
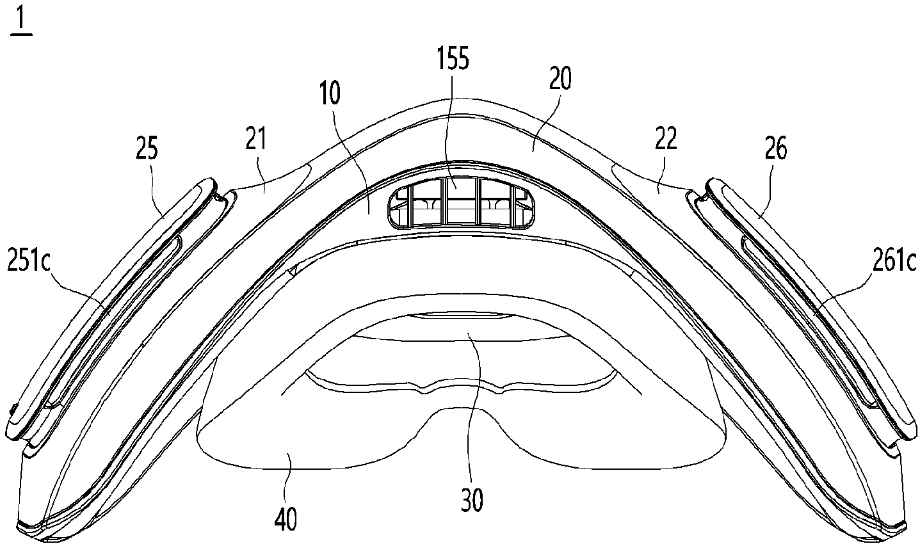
FIG. 4 is a bottom view showing the mask apparatus.

FIG. 1 is a left perspective view showing an example of a mask apparatus, FIG. 2 is a right perspective view showing the mask apparatus, FIG. 3 is a rear view showing the mask apparatus, and FIG. 4 is a bottom view showing the mask apparatus.

Referring to FIGS. 1 to 4, a mask apparatus 1 can include a mask body 10 and a mask body cover 20 coupled to the mask body 10.

The mask body 10 and the mask body cover 20 can be detachably coupled to each other. When the mask body 10 and the mask body cover 20 are coupled to each other, an inner space can be defined between the mask body 10 and the mask body cover 20. Constituents for driving the mask apparatus 1 can be disposed in the inner space. The inner space can be defined between a front surface of the mask body 10 and a rear surface of the mask body cover 20. The mask body 10 can define a rear surface of the mask apparatus 1, and the mask body cover 20 can define a front surface of the mask apparatus 1.

A rear side of the mask apparatus 1 is defined as a direction in which the rear surface of the mask apparatus 1 facing a user's face is disposed, and a front side of the mask apparatus 1 is defined as a direction which is opposite to the rear side and in which a front surface of the mask apparatus, which is exposed to the outside, is disposed.

The mask apparatus 1 can further include a sealing bracket 30 and a seal 40 that is detachably coupled to the sealing bracket 30.

The sealing bracket 30 can be detachably coupled to a rear surface of the mask body 10 to fix the seal 40 to the rear surface of the mask body 10. Also, when the sealing bracket 30 is separated from the rear surface of the mask body 10, the seal 40 can be separated from the mask body 10.

The seal 40 can be supported on the rear surface of the mask body 10 by the sealing bracket 30, and a breathing space S for breathing can be defined between the seal 40 and the rear surface of the mask body 10. The seal 40 can be in close contact with a user's face and can surround user's nose and mouth to restrict introduction of external air into the breathing space S.

The mask body cover 20 can include a first filter mounting portion 21 and a second filter mounting portion 22. The first filter mounting portion 21 can be disposed at a right side of the mask body cover 20, and the second filter mounting portion 22 can be disposed at a left side of the mask body cover 20.

A left direction (left side) and a right direction (right side) are defined based on the mask apparatus 1 worn on the user's face. That is, in the state in which the user wearing the mask apparatus 1, a right side of the user is defined as the right side of the mask apparatus 1, and a left side of the user is defined as the left side of the mask apparatus 1.

Also, an upward direction (upward side) and a downward direction (downward side) are defined based on the mask apparatus 1 mounted on the user's face.

A first filter cover 25 can be mounted on the first filter mounting portion 21, and a second filter cover 26 can be mounted on the second filter mounting portion 22. Filters 23 and 24 (see FIG. 5) can be disposed inside the first filter mounting portion 21 and the second filter mounting portion 22, and the first filter cover 25 and the second filter cover 26 can cover the filter.

The first filter cover 25 and the second filter cover 26 can be detachably coupled to the first filter mounting portion 21 and the second filter mounting portion 22. For example, the first filter cover 25 and the second filter cover 26 can be coupled to be fitted into the first filter mounting portion 21 and the second filter mounting portion 22, respectively.

Each of the first filter cover 25 and the second filter cover 26 can include a front surface portion and side surface portions extending backward along an edge of the front surface portion or an edge of a rear surface.

Each of the side surface portions of the first filter cover 25 and the second filter cover 26 can have four side surfaces, and the four side surfaces can include an upper side surface, a lower side surface, a left side surface, and a right side surface.

One or a plurality of first air inlets 251 can be defined in the side surface portion of the first filter cover 25. One or a plurality of second air inlets 261 can also be defined in the side surface portion of the second filter cover 26.

In the state in which the first filter cover 25 is mounted on the first filter mounting portion 21, the first air inlet 251 can be defined to be exposed to the outside. In the state in which the second filter cover 26 is mounted on the second filter mounting portion 22, the second air inlet 261 can be defined to be exposed to the outside.

The first air inlet 251 and the second air inlet 261 can be defined in the side surfaces of the first filter cover 25 and the second filter cover 26, respectively. In some examples, each of the first and second air inlets 251 and 261 can be respectively defined in the front surface portions of the filter covers 25 and 26.

The first air inlet 251 and the second air inlet 261 can be defined at a point closer to the front surface portion from a line that bisects the side surface portion.

When a plurality of the first air inlets 251 are provided in the side surface portions of the first filter cover 25, the first air inlets 251 can include a first air suction hole 251*a* defined in the right side surface, a second air suction hole 251*b* defined in the left side surface, and a third air suction hole 251*c* defined in the upper side surface.

Similarly, when a plurality of the second air inlets 261 are provided in the side surface portions of the second filter cover 26, the second air inlets 261 can include a first air suction hole 261*a* defined in the left side surface, a second air suction hole 261*b* defined in the right side surface, and a third air suction hole 261*c* defined in the upper side surface.

An opening 252 can be defined in one of the first filter cover 25 or the second filter cover 26, and the opening 252 can be defined in an edge of one of the first filter cover 25 and the second filter cover 26. Also, a manipulation portion 195 for controlling an operation of the mask apparatus 1 can be mounted in the opening 252. In some implementations, the manipulation portion 195 is mounted on the first filter cover 25 as an example.

The manipulation portion 195 can serve as a manipulation switch that turns on/off power of the mask apparatus 1. The manipulation portion 195 can be exposed to the front side of the mask apparatus 1 while being mounted in the opening 252.

The mask body 10 can include a hook mounting portion 108. The hook mounting portion 108 can be provided on the left and right sides of the mask body 10.

That is, the hook mounting portion 108 can include a first hook mounting portion 108*a* provided at a right side of the mask body 10, and a second hook mounting portion 108*b* provided at a left side of the mask body 10.

Each of the first hook mounting portion 108*a* and the second hook mounting portion 108*b* can be provided in plurality to be spaced apart from each other in a vertical direction of the mask body 10. In detail, the first hook mounting portion 108*a* can be provided at each of the upper right and lower right sides of the mask body 10, and the second hook mounting portion 108*b* can be provided at each of the upper left and lower left sides of the mask body 10.

Bands for maintaining the mask apparatus 1 in close contact with the user's face can be coupled to the hook mounting portion 108.

For example, both ends of each of the bands can connect the first hook mounting portion 108*a* to the second hook mounting portion 108*b*. In some examples, two bands can respectively connect two first hook mounting portions 108*a* spaced apart from each other in the vertical direction to two second hook mounting portions 108*b* spaced apart from each other in the vertical direction.

In some cases, the band can have a shape surrounding the user's occipital region, and in the latter case, the band can have a shape that is hooked on both ears of the user.

The hook mounting portion 108 can be formed by cutting a portion of the mask body 10. Thus, air can be introduced into the inner space between the mask body 10 and the mask body cover 20 through a gap defined in the hook mounting portion 108.

In detail, the external air introduced into the inner space through the hook mounting portion 108 can cool electronic components disposed in the inner space. Also, the air of which a temperature increases while cooling the electronic components can be discharged again to the outside of the mask body 10 through the hook mounting portion 108. Also, to restrict a flow of the air introduced into the inner space through the hook mounting portion 108 into the breathing space, the inside of the mask apparatus 1 can have a sealing structure.

The mask body 10 can include an air outlet 129 for supplying the filtered air to the breathing space. The user can breathe while breathing the filtered air supplied through the air outlet 129 to the breathing space.

The air outlet 129 can include a first air outlet 129*a* through which the filtered air introduced into the first air inlet 251 is discharged to the breathing space S and a second air outlet 129*b* through which the filtered air introduced into the second air inlet 261 is discharged to the breathing space S.

The first air outlet 129*a* can be defined at a right side with respect to a center of the mask body 10, and the second air outlet 129*b* can be defined at a left side with respect to the center of the mask body 10. The air introduced through the first air inlet 251 can pass through the filter 23 and then flow to the first air outlet 129*a*. The air introduced through the second air inlet 261 can pass through the second filter 24 and then flow to the second air inlet 261.

The mask body 10 can include air exhaust holes 154 and 155 for discharging air exhaled by the user to an external space. The air exhaust holes 154 and 155 can be defined in a lower portion the mask body 10.

The air exhaust holes 154 and 155 can include a first air exhaust hole 154 defined in a front lower end of the mask body 10 and a second air exhaust hole 155 defined in a bottom surface of the mask body 10.

In detail, a rib extending forward can be formed at the front lower end of the mask body 10, and a surface defined by the rib can be defined as the bottom surface of the mask body 10.

A flow space through the air flowing toward the second air exhaust hole 155 by passing through the first air exhaust hole 154 descends can be defined between the mask body 10 and the mask body cover 20.

A check valve can be provided in one or more of the first air exhaust hole 154 and the second air exhaust hole 155. The external air can be introduced into the breathing space, or the air discharged through the second air exhaust hole 155 can be blocked from flowing backward by the check valve. The check valve can be disposed in the flow space between the first air exhaust hole 154 to the second air exhaust hole 155.

For example, the check valve in a form of a flat flap having a size and shape corresponding to the size and shape of the first air exhaust hole 154 can be provided.

In detail, an upper end of the flap can be connected to an upper edge of the first air exhaust hole 154, and when the user exhales, the flap can be bent or rotate to open the first air exhaust hole 154, and when the user inhales, the flap can be in close contact with the first air exhaust hole 154 to block the external air or the discharged air being introduced again into the breathing space.

The mask body 10 can include a sensor mounting portion 109. The sensor mounting portion 109 can be equipped with a sensor for acquiring various pieces of information from the breathing space. The sensor mounting portion 109 can be disposed above the mask body 10. When the user breathes, the sensor mounting portion 109 can be disposed above the mask body 10 in consideration of a position at which a pressure change in the breathing space is constantly sensed.

The mask body 10 can include a connector hole 135. The connector hole 135 can be understood as an opening in which a connector 192 for supplying power to the mask apparatus 1 is installed. The connector hole 135 can be defined at either a left edge or a right edge of the mask body 10.

In some implementations, since the manipulation portion 195 and the connector 192 are connected to a power module 19 (see FIG. 5) to be described later, the connector hole 135 can be provided at one side of the left or the right side of the mask body 10, which corresponds to the position at which the power module 19 is installed.

Hereinafter, constituents of the mask apparatus 1 will be described in detail based on an exploded perspective view.

Figure 5:
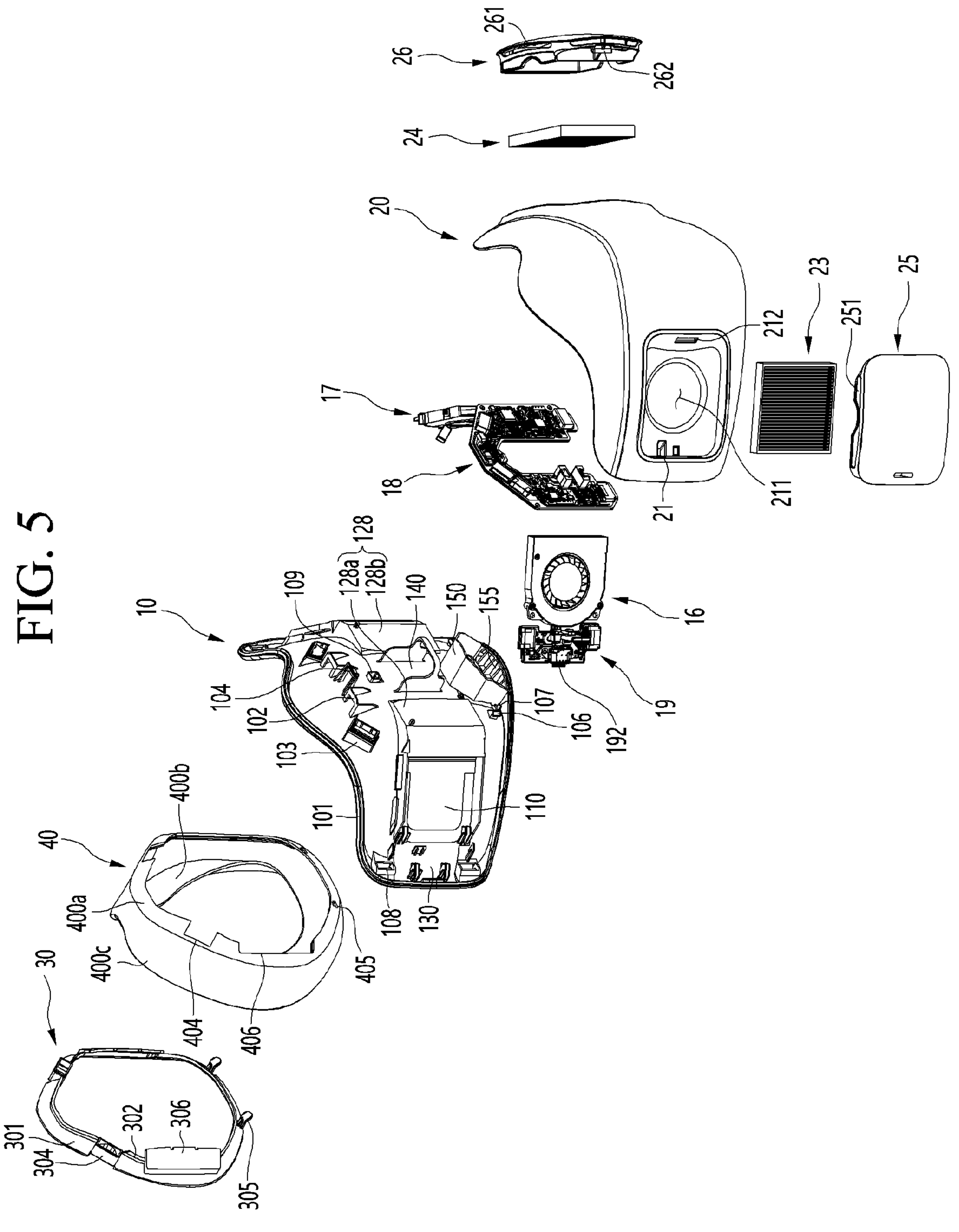
FIG. 5 is an exploded perspective view showing the mask apparatus.

FIG. 5 is an exploded perspective view of the mask apparatus.

Referring to FIG. 5, the mask apparatus 1 can include the mask body 10, the mask body cover 20, the sealing bracket 30, and the seal 40.

In detail, the mask body 10 and the mask body cover 20 can be coupled to each other to form an outer appearance of the mask apparatus 1.

An inner space for accommodating components for the operation of the mask apparatus 1 can be defined between the mask body 10 and the mask body cover 20. The sealing bracket 30 and the seal 40 are coupled to the rear surface of the mask body 10 to define the breathing space between the user's face and the mask body 10, and the seal 40 can block the external air being introduced into the breathing space.

The mask body 10 can include a cover coupling groove 101. The cover coupling groove 101 can be defined along a front edge of the mask body 10. The cover coupling groove 101 can be defined by a height difference. The cover coupling groove 101 can be defined to correspond to an edge of the mask body cover 20. The cover coupling groove 101 can be defined by recessing a portion of the front surface of the mask body 10 backward. The mask body cover 20 can move toward the cover coupling groove 101 of the mask body 10 to allow the mask body cover 20 to be inserted into the cover coupling groove 101.

The mask body 10 can include a first cover coupling portion 102. An upper portion of the mask body cover 20 can be supported on the first cover coupling portion 102. The first cover coupling portion 102 can be disposed on a front upper portion of the mask body 10.

For example, the first cover coupling portion 102 can have a structure that is capable of being hook-coupled. The hook coupled to the first cover coupling portion 102 can be disposed on a rear surface of the mask body cover 20.

The first cover coupling portion 102 can be provided in plurality, and the hook can also be provided in plurality to correspond to the first cover coupling portions 102. In some implementations, the first cover coupling portion 102 can be provided at the left and right sides from the center of the mask body 10. The first cover coupling portion 102 can be referred to as an upper cover coupling portion.

The mask body 10 can include a first bracket coupling portion 103. The first bracket coupling portion 103 can be disposed above the mask body 10. The first bracket coupling portion 103 can support an upper portion of the sealing bracket 30.

The first bracket coupling portion 103 can be disposed above a rear surface of the mask body 10.

For example, the first bracket coupling portion 103 can be provided by allowing a portion constituting the mask body 10 to protrude forward from the rear surface of the mask body 10. Thus, the first bracket coupling portion 103 can be understood as a recess when viewed from a rear side of the mask body 10 and a protrusion when viewed from a front side of the mask body 10.

The sealing bracket 30 can include a first body coupling portion 304 that has the same shape as the recessed shape of the first bracket coupling portion 103 and is seated on the first bracket coupling portion 103.

The first bracket coupling portion 103 can be provided at each of the left and right sides of the mask body 10. The first bracket coupling portion 103 can be defined as an upper bracket coupling portion.

The mask body 10 can include a support rib 104.

The support rib 104 can be provided to protrude forward from the front surface of the mask body 10. The support rib

104 can contact the rear surface of the mask body cover 20 when the mask body cover 20 is coupled to the mask body 10.

The mask body 10 and the mask body cover 20 can resist external forces acting in a front and rear direction by the support rib 104. The support ribs 104 can be provided in plurality on the front surface of the mask body 10.

The support rib 104 can perform a function of fixing a portion of the control module 18 mounted on the mask body 10. For this, the support rib 104 can include a hook shape. In other words, a hook protrusion can protrude from an end of the support rib 104 to fix the end of the control module 18.

The mask body 10 can include a second cover coupling portion 106.

A lower portion of the mask body cover 20 can be supported on the second cover coupling portion 106. The second cover coupling portion 106 can protrude in a hook shape from a front lower end of the mask body 10. The first cover coupling portion 102 can be provided at each of the left and right sides from the center of the mask body 10. The second cover coupling portion 106 can be defined as a lower cover coupling portion.

A hook catching portion to which the second cover coupling portion 106 is coupled can be disposed on the mask body cover 20, and the hook catching portion can be disposed at each of left and right sides of the mask body cover 20.

The mask body 10 can include a second bracket coupling portion 107.

A lower portion of the sealing bracket 30 can be supported on the second bracket coupling portion 107. The second bracket coupling portion 107 can be provided by opening the mask body 10. The second bracket coupling portion 107 can be disposed in a lower portion of the mask body 10. For example, the second bracket coupling portion 107 can be provided as a through-hole defined in the mask body 10.

A second body coupling portion 305 coupled to the second bracket coupling portion 107 can be disposed on the sealing bracket 30. The second bracket coupling portion 107 can be provided in plurality, and the second body coupling portion 305 can also be provided in plurality to correspond to the second bracket coupling portions 107. In some implementations, the second bracket coupling portion 107 can be provided at each of the left and right sides with respect to the center of the mask body 10. The second bracket coupling portion 107 can be defined as a lower bracket coupling portion.

The mask body 10 can include the above-described sensor mounting portion 109.

The sensor mounting portion 109 can have a rib shape in which a portion of the front surface of the mask body 10 protrudes forward. In detail, the sensor mounting portion 109 has a rib shape that is surrounded along an edge of the sensor, and an installation space in which the sensor is installed is defined in the sensor mounting portion 109.

A hole through which the installation space and the breathing space communicate with each other is defined in the mask body 10 corresponding to the inside of the sensor mounting portion 109. The sensor disposed in the installation space can include a pressure sensor, and the pressure sensor can sense pressure information of the breathing space through the hole.

The mask body 10 can include a fan module mounting portion 110.

The fan module mounting portion 110 can include a first fan module mounting portion on which a first fan module 16 is mounted and a second fan module mounting portion on which a second fan module 17 is mounted.

The first fan module mounting portion and the second fan module mounting portion can be disposed on the front surface of the mask body 10. In detail, the first fan module mounting portion can be disposed at the right side of the mask body 10, and the second fan module mounting portion can be disposed at the left side of the mask body 10.

The first fan module 16 and the second fan module 17 can be detachably coupled to the first fan module mounting portion and the second fan module mounting portion, respectively.

The mask body 10 can include an air duct 120.

The air duct 120 can be disposed on the front surface of the mask body 10. A passage through which air passes can be provided in the air duct 120. The fan module mounting portion 110 can be disposed at a suction-side of the air duct 120. The suction-side of the air duct 120 can be defined as any location where the air duct 120 introduces air therein. For instance, the suction-side may be a lateral side, a top side, a bottom side, a front side, or a rear side, etc. of the air duct 120.

The air duct 120 can include a first air duct connected to the first fan module mounting portion and a second air duct connected to the second fan module mounting portion.

The first air duct and the second air duct can be respectively disposed on an edge of the first fan module mounting portion and an edge of the second fan module mounting portion, which are adjacent to the center of the front surface of the mask body 10 so as to be disposed between the first fan module mounting portion and the second fan module mounting portion.

Also, the first fan module mounting portion and the second fan module mounting portion can have a shape symmetrical with respect to a vertical plane (or a vertical line) passing through the center of the front surface of the mask body 10. Similarly, the first air duct and the second air duct can also have a shape symmetrical with respect to the vertical plane or the vertical line passing through the center of the front surface of the mask body 10.

One end of the air duct 120 communicates with the outlet of the fan module 16 and 17 to allow the external air to be introduced into the air duct 120. In addition, the other end of the air duct 120 communicates with the air outlet 129 so that the air introduced into the air duct 120 is discharged into the breathing space S.

A control module 18 can be mounted on the front surface of the air duct 120.

A control module mounting portion 128 for mounting the control module 18 can be disposed on the front surface of the air duct 120. A portion of the front surface of the air duct 120 can be provided as a flat portion on which the control module 18 is capable of being seated, and the flat portion can be defined as the control module mounting portion 128.

The control module mounting portion 128 can include a first control module mounting portion **128*a* provided in the first air duct and a second control module mounting portion 128*b* provided in the second air duct. One control module 18 can be fixed to the first control module mounting portion 128*a* and the second control module mounting portion 128*b*, or a plurality of control modules can be respectively fixed to the first and second control module mounting portions 128*a* and 128*b***.

The mask body 10 can include a power module mounting portion 130 for mounting the power module 19.

The power module mounting portion 130 can be disposed on the front surface of the mask body 10. The power module mounting portion 130 can be provided at one of the left and the right side of the mask body 10.

The power module mounting portion 130 can be disposed at the side of the fan module mounting portion 110. Specifically, the power module mounting portion 130 can be provided between the fan module mounting portion 110 and a side end of the mask body 10. The side end of the mask body 10 can be defined as an end adjacent to the user's ear when worn. Also, the connector hole 135 can be formed in the side end of the mask body 10, which is provided with the power module mounting portion 130.

The mask body 10 can include a battery mounting portion 140 for mounting a battery.

The battery mounting portion 140 can be disposed at a center of the front surface of the mask body 10. The battery mounting portion 140 can be provided to protrude forward from the front surface of the mask body 10 so as to surround the battery.

For example, the battery mounting portion 140 can include a pair of guide ribs protruding forward from the front surface of the mask body 10 and a connection rib connecting front ends of the pair of guide ribs to each other. Also, the battery can be mounted in a battery accommodation space defined by the pair of guide ribs and the connection rib.

The battery can move downward from an upper side of the battery accommodating space and be inserted into the battery accommodating space and then can move in a reverse direction to be separated. A lower portion of the battery inserted into the battery mounting portion 140 can be supported by an air discharge portion 150 to be described later.

The mask body 10 can include the air discharge portion 150.

The air discharge portion 150 can be disposed in a lower portion of the mask body 10. The air discharge portion 150 can define a flow space through which the air flowing from the first air exhaust hole 154 toward the second air exhaust hole 155 passes.

The air discharge portion 150 can protrude forward from the front surface of the mask body 10. Also, the air discharge portion 150 can extend to be rounded in an arch shape or can extend to be bent several times.

When the mask body cover 20 is coupled to the mask body 10, a front end of the air discharge portion 150 can contact the rear surface of the mask body cover 20, and the inner space of the mask body 10 and the flow space can be partitioned from each other.

The air discharge portion 150 can define a top surface and both side surfaces of the flow space, and a rear surface of the mask body cover 20 can define a front surface of the flow space. Also, the front surface of the mask body 10 can define a rear surface of the flow space, and the bottom surface of the mask body 10 on which the second air exhaust hole 155 is defined can define a bottom surface of the flow space.

The top surface of the air discharge portion 150 can support a lower end of the battery. Both lower ends of the air discharge portion 150 having the arch shape or tunnel shape can be connected to the bottom surface of the mask body 10, and the bottom surface of the mask body 10 can be defined by the rib extending forward from the lower end of the front surface of the mask body 10. The cover coupling groove 101 is recessed along the front end of the rib defining the bottom surface of the mask body 10, and the lower end of the rear surface of the mask body cover 20 is coupled to the cover coupling groove 101.

The first air exhaust hole 154 can be defined in the front surface of the mask body 10 defining the rear surface of the flow space.

The mask body cover 20 can include a pair of filter mounting portions 21 and 22, as described above.

The filter mounting portions 21 and 22 can be provided by recessing the front surface of the mask body cover 20 by a predetermined depth toward the rear surface of the mask body cover 20. Filters 23 and 24 are accommodated inside the filter mounting portions 21 and 22, and filter covers 25 and 26 can be mounted on edges of the filter mounting portions 21 and 22 in the state in which the filters 23 and 24 are accommodated.

Air suction holes 211 and 221 can be defined in the filter mounting portions 21 and 22. The air suction holes 211 and 221 can communicate with fan inlets defined in bottom surfaces of the fan modules 16 and 17, respectively. Each of edges of the air suction holes 211 and 221 can have an inclined surface that inclined in a direction in which a diameter gradually decreases from the front surface to the rear surface.

Filter cover mounting grooves 212 and 222 for fixing the filter covers 25 and 26 can be defined in side surfaces of the filter mounting portions 21 and 22. Coupling protrusions inserted into the filter cover mounting grooves 212 and 222 can be disposed on the filter covers 25 and 26. FIG. 5 illustrates only the coupling protrusion 262 disposed on the left filter cover 26, but the same coupling protrusion is disposed on the right filter cover 25 as well.

A sealing material for sealing can be provided between the edges of the rear surfaces of the air suction holes 211 and 221 of the filter mounting portions 21 and 22 and the fan inlets of the fan modules 16 and 17. The sealing material can surround the air suction holes 211 and 221 and edges of the fan inlets of the fan modules 16 and 17 to block the external air.

The sealing material can be fixed to the rear surface of the filter mounting portions 21 and 22, and when the mask body cover 20 is coupled to the mask body 10, the filter mounting portions 21 and 22 and the sealing material can press the front surfaces of the fan modules 16 and 17 so that the fan modules 16 and 17 are firmly fixed to the fan module mounting portion 110. As a result, the vibration generated by the fan modules 16 and 17 and the noise due to the vibration can be reduced.

The filter mounting portions 21 and 22 include a first filter mounting portion 21 provided at the right side of the mask body cover 20 and a second filter mounting portion 22 provided at the left side of the mask body cover 20.

The air suction hole defined in the first filter mounting portion 21 can be defined as a first air suction hole 211, and the air suction hole defined in the second filter mounting portion 22 can be defined as a second air suction hole 221.

The filters 23 and 24 can include a first filter 23 accommodated inside the first filter mounting portion 21 and a second filter 24 accommodated inside the second filter mounting portion 22.

The filter covers 25 and 26 can include a first filter cover 25 mounted on the first filter mounting portion 21 and a second filter cover 26 mounted on the second filter mounting portion 22. A plurality of first air inlets 251 can be defined in the first filter cover 25 to allow the external air to be introduced, and a plurality of second air inlets 261 can be defined in the second filter cover 26 to allow the external air to be introduced.

The control module 18 can be referred to as a first electronic circuit component, and the power module 19 can be referred to as a second electronic circuit component.

The fan modules 16 and 17 can include a fan, a fan motor, and a fan housing accommodating the fan and the fan motor. The fan housing can include a fan inlet through which the external air is introduced into the fan, and a fan outlet through which the air forcedly flowing by the fan is discharged.

The fan can include a centrifugal fan that suctions air from the front side of the mask body cover 20 and discharges the air to the side of the mask body 10. In some examples, the fan can include the axial fan or the cross-flow fan.

The air introduced through the first air inlet 251 to pass through the first filter 23 is suctioned through the first air suction hole 211. Also, the air introduced through the second air inlet 261 to pass through the second filter 24 is suctioned through the second air suction hole 221.

The fan outlet of the first fan module 16 can communicate with the first air duct to discharge the air to the breathing space, and the fan outlet of the second fan module 17 can communicate with the second air duct to discharge the air to the breathing space.

The control module 18 can control an operation of the mask apparatus 1. The control module 18 can be fixed to the control module mounting portion 128.

The control module 18 can include a communication module to transmit and receive various types of information. The control module 18 can include a data storage module to store various types of information.

The control module 18 can control an operation of each of the fan modules 16 and 17. In detail, the control module 18 can control the operation of each of the fan modules 16 and 17 based on information sensed from the sensor.

The control module 18 can be electrically connected to the power module 19, the fan modules 16 and 17, and the battery so as to be interlocked with each other.

The power module 19 can receive power from the outside. The power module 19 can include a charging circuit for charging the battery. The power module 19 can include the connector 192 and the manipulation portion 195. Thus, the control module 18 can operate by receiving battery power or external power through the connector 192.

The power module 19 can control supply of power to the mask apparatus 1 by the manipulation portion 195. In detail, the power module 19 can control supply of power from the battery to the control module 18 and the fan modules 16 and 17.

The seal 40 can be coupled to the rear surface of the mask body 10 by the sealing bracket 30 to be in close contact with the user's face.

The rear surface of the mask body 10 can be to be spaced apart from the user's face by the seal 40.

The sealing bracket 30 can be provided in a ring shape forming a closed loop.

The seal 40 can be detachably coupled to the sealing bracket 30.

Also, the sealing bracket 30 is coupled to be detachable from the mask body 10 to separate the sealing bracket 30 from the mask body 10. With this structure, only the sealing bracket 30 can be separated, or an assembly of the seal 40 and the sealing bracket 30 can be separated from the mask body 10 to clean only sealing bracket 30 or clean both the sealing bracket 30 and the seal 40.

After the seal 40 is coupled to the sealing bracket 30, the sealing bracket 30 is coupled to the mask body 10, then the seal 40 is stably fixed to the mask body 10.

The sealing bracket 30 can include a sealing insertion portion 301 inserted into an inner edge of the seal 40.

Figure 13:
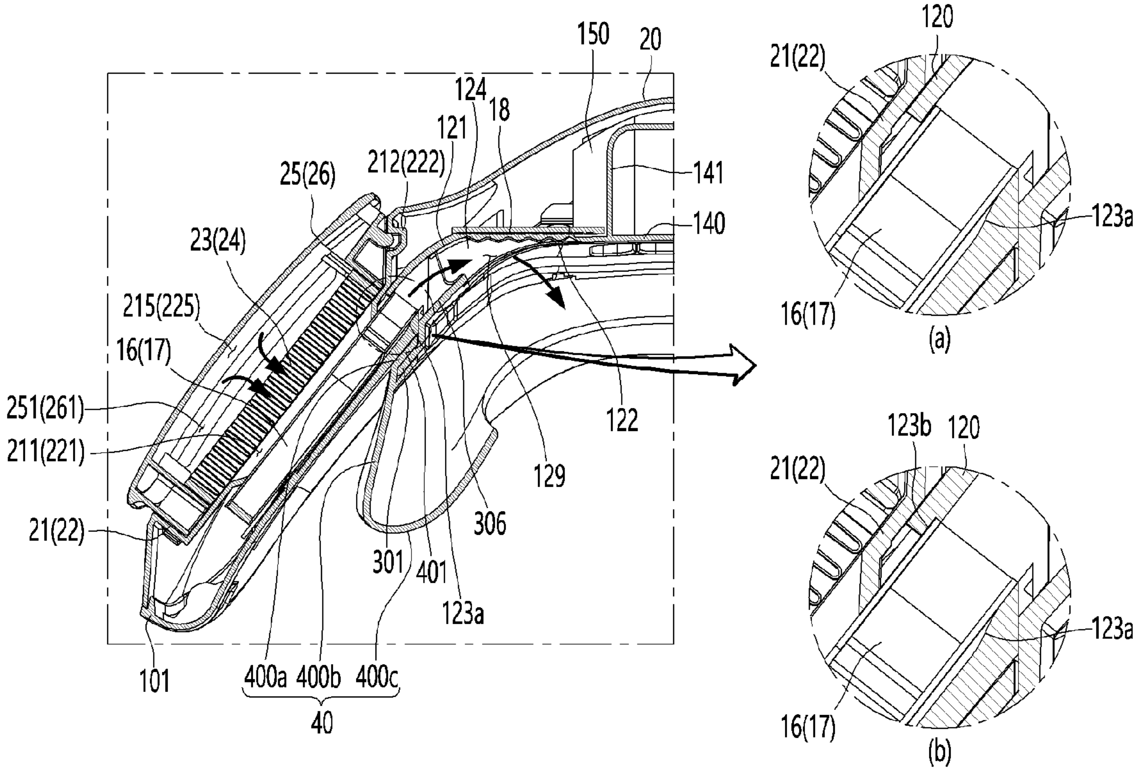
FIG. 13 is a cross-sectional view of the mask apparatus, taken along line 13-13 of FIG. 1.

The inner edge of the seal 40 can be provided in a shape of seal lips that is branched into two portions, and the sealing insertion portion 301 can be inserted into the seal lips (see FIG. 13).

The sealing insertion portion 301 can have a cross-sectional shape having a constant thickness or a cross-sectional shape of which a thickness decreases from an inner edge toward an outer edge. A body of the sealing bracket 30 can be provided by the sealing insertion portion 301 and a fixing guide 302 to be described later.

The sealing bracket 30 can include the fixing guide 302.

The fixing guide 302 can be bent at an inner end of the sealing insertion portion 301. When the sealing insertion portion 301 is completely inserted into the seal lips of the seal 40, one of the two seal lips is in contact with the fixing guide 302. That is, when the inner edge of the seal 40 is in contact with the fixing guide 302, it can be understood that the seal 40 is completely coupled to the sealing bracket 30.

The sealing bracket 30 can include a bracket insertion portion 306 coupled to the mask body 10. The bracket insertion portion 306 is inserted into a cutoff portion defined in the rear surface of the mask body 10 to cover a portion of an edge of the cutoff portion.

The cutoff portion can be understood as an opening communicating with the air duct 120 so that the air passes therethrough. The bracket insertion portion 306 can be disposed on one edge of the cutoff portion, specifically, an outer edge.

The air outlet 129 already described can be understood as the remaining portion of the cutoff portion that is not covered by the bracket insertion portion 306 in a state in which the bracket insertion portion 306 is inserted into one side of the cutoff portion.

When the bracket insertion portion 306 is inserted into or coupled to the one side of the cutoff portion to shield the one side of the cutoff portion, the air discharged from the fan modules and 17 can pass between the air duct 120 and the bracket insertion portion 306 to flow to the air outlet 129.

The bracket insertion portion 306 can perform a function of fixing the sealing bracket 30 to the mask body 10 while defining one surface of the air duct 120. In detail, an upper portion of the sealing bracket 30 can be fixed to the upper portion of the mask body 10 by the first body coupling portion 304, a lower portion of the sealing bracket 30 can be fixed to the lower portion of the mask body 10 by the second body coupling portion 305, and an intermediate portion of the sealing bracket 30 can be fixed to an intermediate portion of the mask body 10 by the bracket insertion portion 306.

The seal 40 can be made of a material having elasticity. The seal 40 can be in close contact with the user's face and deformed to correspond to a facial contour of the user. The seal 40 can be provided in a ring shape forming a closed loop. The seal 40 can be provided to cover the user's nose and mouth.

The seal 40 can include a coupling portion 400*a* coupled to the mask body 10, a side surface portion 400*c* extending from the coupling portion 400*a* toward the user's face, and a contact portion 400*b* that is bent from an end of the side surface portion 400*c* to extend toward the coupling portion 400*a*.

The contact portion 400*b* can be a portion that is in close contact with the user's face, and the side surface portion 400*c* and the contact portion 400*b* can be angled at an angle of about 90 degrees or less to define a space between the side surface portion 400*c* and the contact portion 400*b*.

A first opening can be defined inside the coupling portion 400*a* of the seal 40, and a second opening can be defined inside the contact portion 400*b*. As illustrated in FIG. 3, the second opening can include a main opening in which the front of the user's nose and mouth are disposed and a sub opening extending from an upper end of the main opening and disposed on the user's nose.

Also, a lower portion of the main opening, that is, a portion that is in close contact with the front of the user's jaw can be designed closer to the mask body 10 than a portion that is in close contact with the front of the user's cheek.

In some examples, a plurality of ventilation holes can be defined in the contact portion 400*b* to minimize a phenomenon in which moisture is generated on the user's cheek. The plurality of ventilation holes can have different sizes, and as an example, a diameter of the ventilation hole can gradually increase from an inner edge to an outer edge of the contact portion 400*b*.

The air outlet 129 and the air exhaust holes 154 and 155 can be provided inside the first opening, and the user's nose and mouth can be disposed inside the second opening.

The seal 40 is disposed between the user's face and the mask body 10, and the breathing space S is defined by the coupling portion 400*a*, the contact portion 400*b*, and the inner side of the side surface portion 400*c* of the seal 40.

A bracket insertion groove 401 can be defined in an end of the coupling portion 400*a* of the seal 40. (see FIG. 13)

The bracket insertion groove 401 can be understood as a groove or a space defined between the two seal lips when the coupling portion 400*a* has the shape that is branched into the two seal lips as described above, and the bracket insertion portion 301 of the sealing bracket 30 is inserted into the bracket insertion groove 401.

The seal 40 can include a first mounting portion 404 on which the first body coupling portion 304 is seated, a second mounting portion 405 on which the second body coupling portion 305 is seated, and a third mounting portion 406 on which the bracket insertion portion 306 is seated.

The first and third mounting portions 404 and 406 can be understood as grooves in which a portion of the seal 40 is cut to form an accommodation space in which the first body coupling portion 304 and the bracket insertion portion 306 are accommodated. Also, the second mounting portion 405 can be understood as a hole in which a portion of the seal 40 is cut to pass through the second body coupling portion 305.

In another aspect, the first mounting portion 404 can be defined as a first opening, the second mounting portion 405 can be defined as a second opening, and the third mounting portion 406 can be defined as a third opening.

Figure 6:
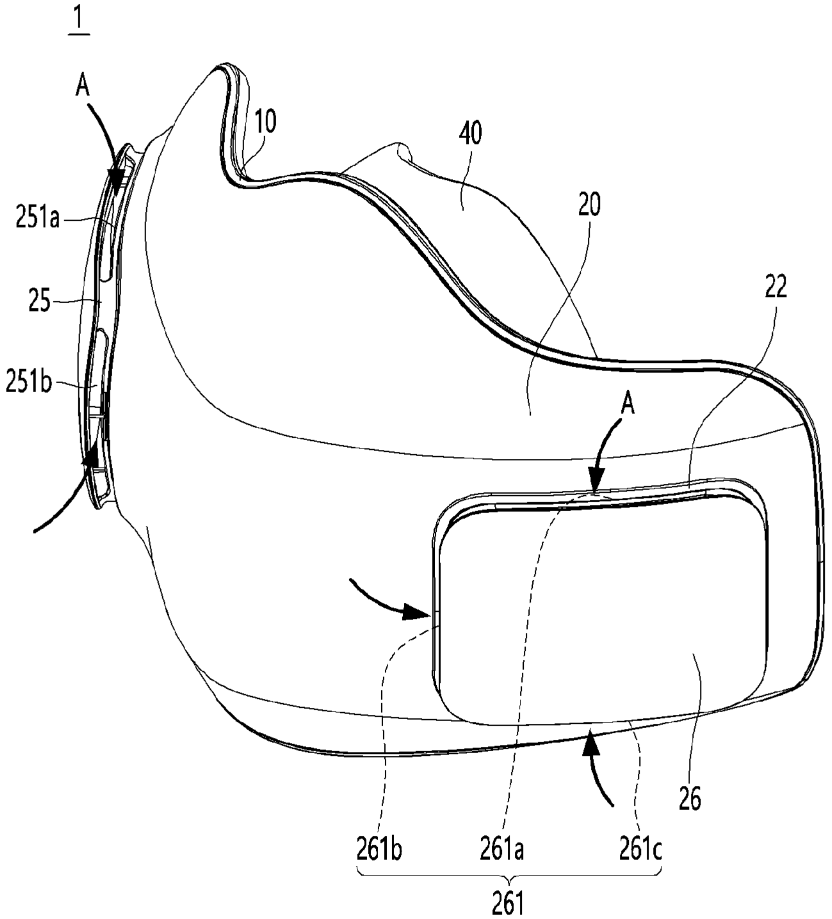
FIGS. 6 and 7 are views illustrating examples of a flow of air of the mask apparatus.
Figure 7:
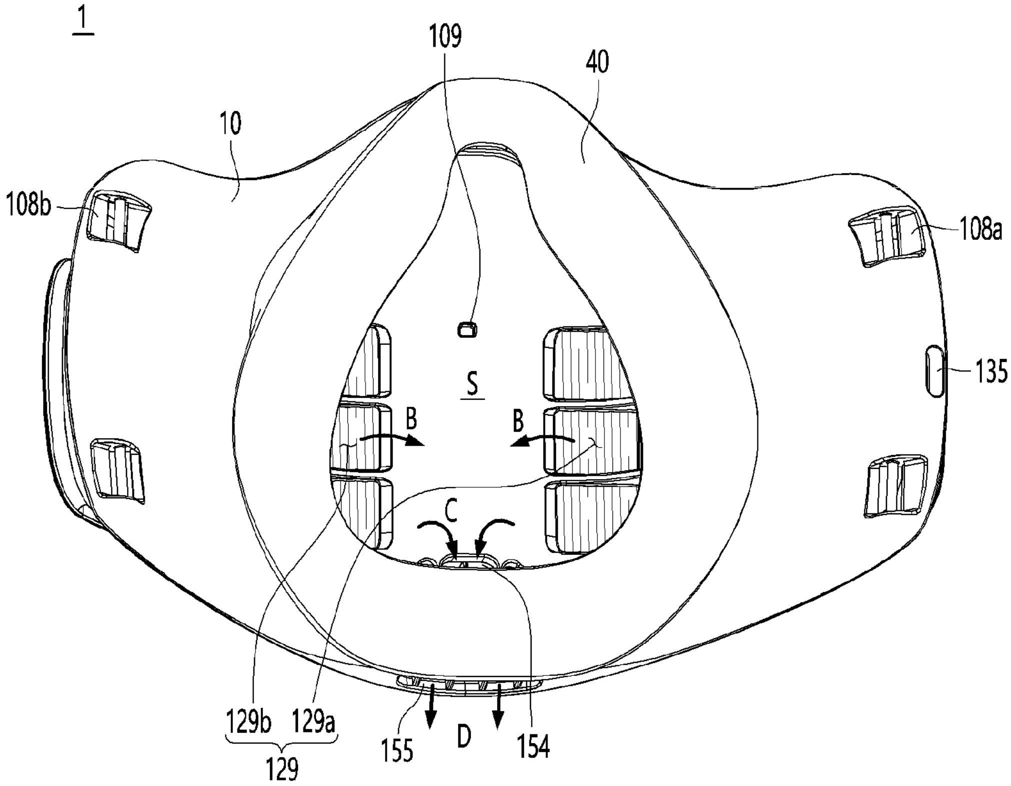

FIGS. 6 and 7 are views illustrating examples of a flow of air when the mask apparatus operates.

Referring to FIGS. 6 and 7, the mask apparatus 1 can suction the external air through the air inlets 251 and 261 provided in the filter covers 25 and 26. The flow direction of the external air suctioned into the mask apparatus 1 is indicated by a reference symbol A. Since the air inlets 251 and 261 are provided in plurality to suction the air in various directions, an inflow rate of the external air increases.

For example, the air inlets 251 and 261 can include air inlets 251*a* and 261*a* for suctioning air flowing at upper sides of the filter covers 25 and 26, air inlets 251*b* and 261*b* for suctioning air flowing at a front side of the filter covers 25 and 26, and air inlets 251*c* and 261*c* for suctioning air flowing at a lower side of the filter covers 25 and 26. The side air inlets 251*b* and 261*b* can be provided at one or both sides of the left and right sides of the filter covers 25 and 26.

Since the filter covers 25 and 26 in which the air inlets 251 and 261 are provided are respectively disposed at left and right sides of the front surface of the mask apparatus 1, the external air can be smoothly suctioned from the left and right sides of the front surface of the mask apparatus 1.

The external air introduced through the air inlets 251 and 261 can be filtered by passing through the filters 23 and 24 disposed inside the filter mounting portions 21 and 22. The filters 23 and 24 can be replaced when the filter covers 25 and 26 are separated from the mask apparatus 1.

The air passing through the filters 23 and 24 can be introduced into the fan inlets of the fan modules 16 and 17 through the air suction holes 211 and 221. Since the filter mounting portions 21 and 22, in which the air suction holes 211 and 221 are defined, and the fan modules 16 and 17 are assembled in the state of being in close contact with each other, the air passing through the filter may not leak, or the external air may not be introduced between the filter mounting portions 21 and 22 and the fan modules 16 and 17.

The air discharged through the fan outlets of the fan modules 16 and 17 can pass through the air duct 120 to flow into the breathing space S through the air outlet 129. A flow direction of the air introduced into the breathing space S through the air outlet 129 is indicated by a reference symbol B.

The breathing space S can be defined by the mask body 10 and the seal 40. When the mask body 10 is put one the user's face, the seal 40 can be in close contact with the mask body 10 and the user's face to form an independent breathing space that is separated from the external space.

The air that user exhales after suctioning the filtered air supplied through the air outlet 129 can be exhausted to the external space through the air exhaust holes 154 and 155.

As described above, the air exhaust holes 154 and 155 include a first air exhaust hole 154 communicating with the breathing space and a second air exhaust hole 155 communicating with the external space, and the first air exhaust hole 154 and the second air exhaust hole 155 can communicate with each other by the flow space defined by the air discharge portion 150. The air exhaled by the user can be guided into the flow space through the first air exhaust hole 154. A flow direction of the air flowing into the flow space through the first air exhaust hole 154 is indicated by a reference symbol C.

The air guided into the flow space through the first air exhaust hole 154 can be discharged to the external space through the second air exhaust hole 155. A flow direction of the air discharged into the external space through the second air exhaust hole 155 is indicated by a reference symbol D.

Figure 8:
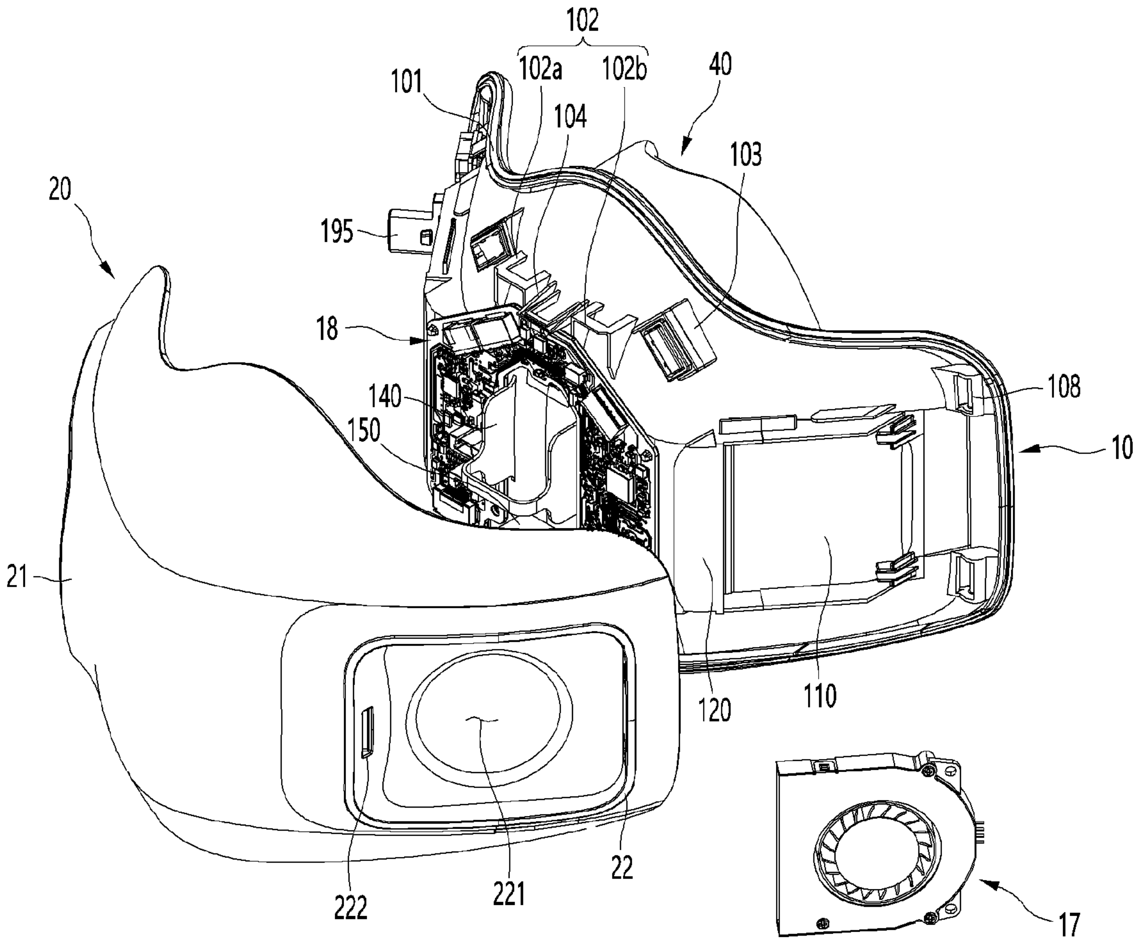
FIG. 8 is a front exploded view showing the mask apparatus.
Figure 9:
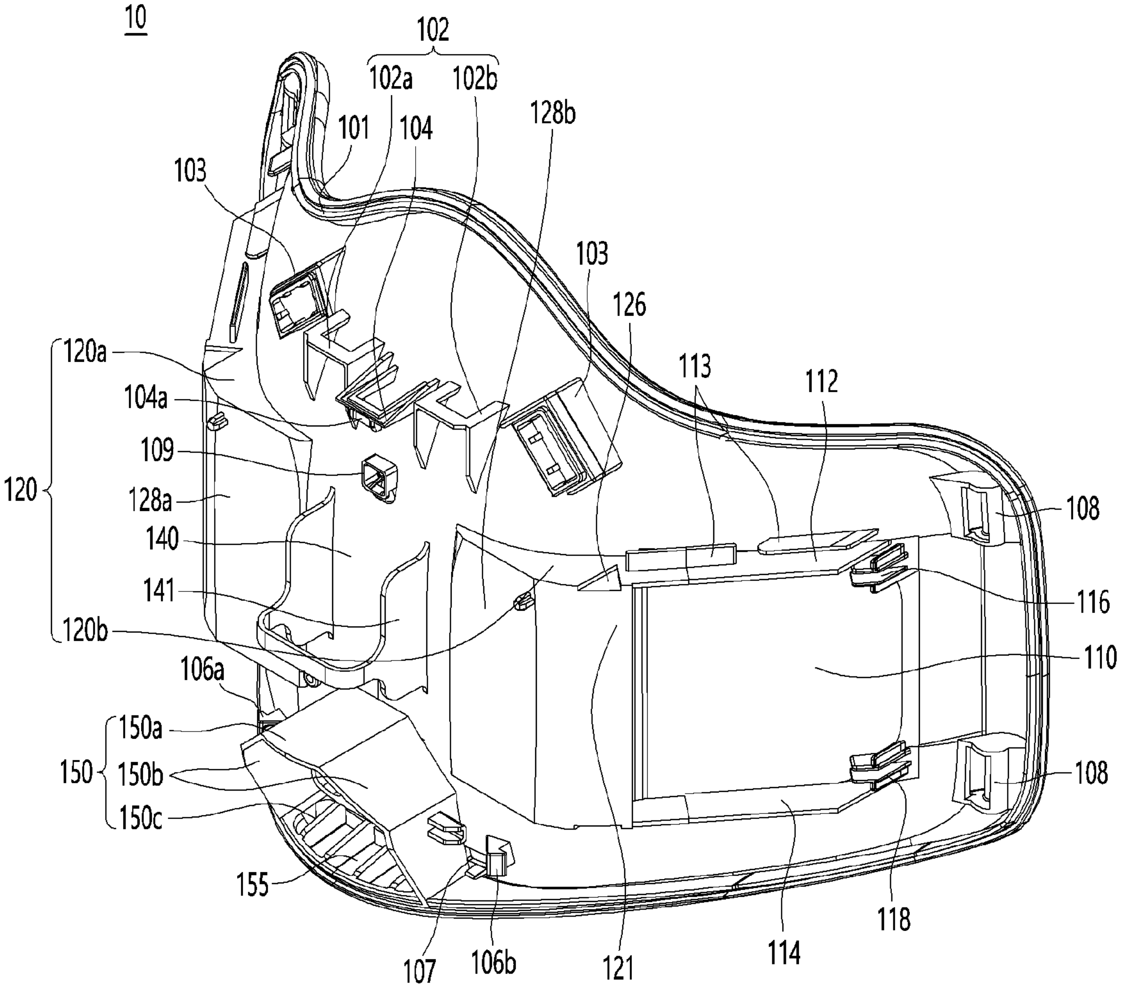
FIG. 9 is a front perspective view showing an example of a mask body of the mask apparatus.
Figure 10:
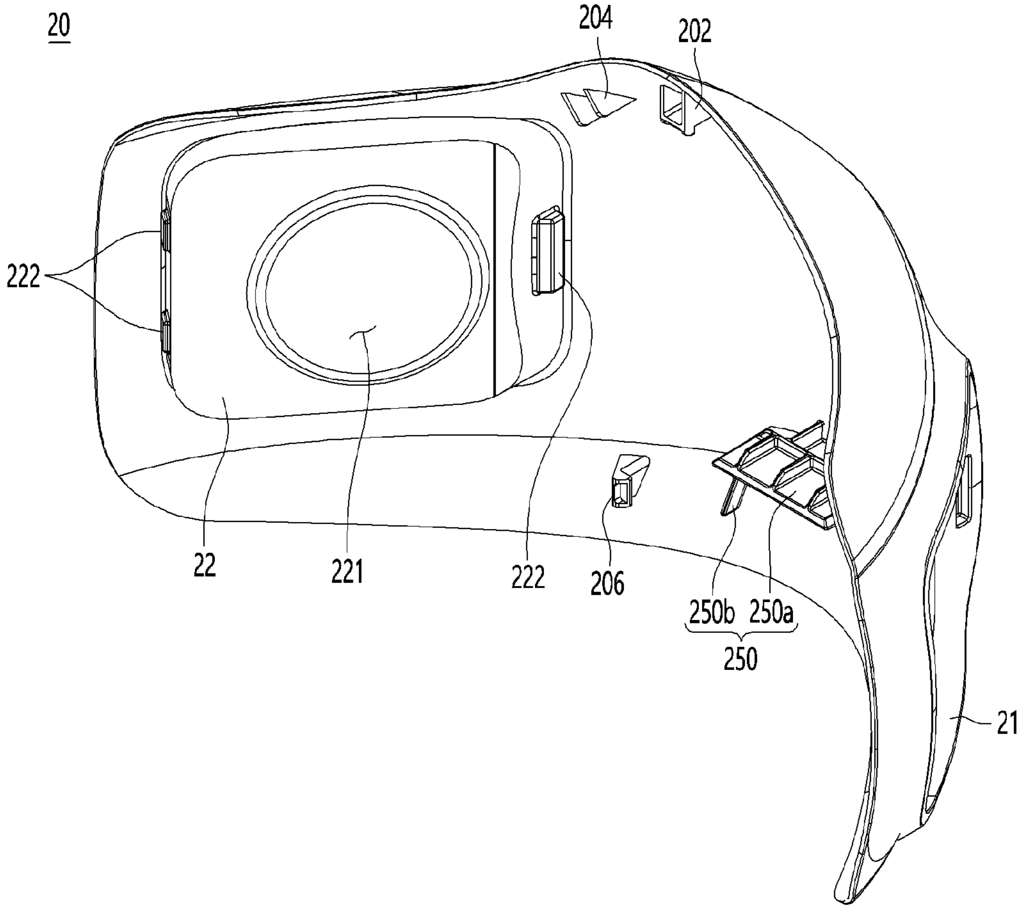
FIG. 10 is a rear perspective view showing an example of a mask body cover of the mask apparatus.

FIG. 8 is a front exploded view showing the mask apparatus, FIG. 9 is a front perspective view showing an example of a mask body of the mask apparatus, and FIG. 10 is a rear perspective view showing an example of a mask body cover of the mask apparatus.

Referring to FIGS. 8 to 10, an outer appearance of the mask apparatus 1 can be defined by coupling the mask body 10 to the mask body cover 20. An inner space in which fan modules 16 and 17, a power module 19, a control module 18, and a battery are accommodated can be defined between the mask body 10 and the mask body cover 20. The fan modules 16 and 17, the power module 19, the control module 18, and the battery accommodated in the inner space can be fixed to the front surface of the mask body 10. The first cover coupling portion 102 protruding from the front surface of the mask body 10 can include a right cover coupling portion 102*a* and a left cover coupling portion 102*b*.

A first body fixing portion 202 coupled to the first cover coupling portion 102 can be disposed on the rear surface of the mask body cover 20. The first body fixing portion 202 can be provided in a number corresponding to the number of the first cover coupling portions 102 at a position corresponding to the first cover coupling portion 102. The first body fixing portion 202 has a hook shape so as to be hook-coupled to the first cover coupling portion 102.

A second body fixing portion 206 coupled to the second cover coupling portion 106 can be disposed below the rear surface of the mask body cover 20.

The second body fixing portion 206 can be provided in a number corresponding to the number of the second cover coupling portions 106 at a position corresponding to the second cover coupling portion 106. The second body fixing portion 206 can have a hook shape so as to be hook-coupled to the second cover coupling portion 106. The second cover coupling portion 106 can be disposed at each of the left and right sides of the air discharge portion 150.

A fixing hook 104*a* can protrude downward to support an upper end of the control module 18 at a front end of the support rib 104 protruding from the front surface of the mask body 10 corresponding between the right cover coupling portion 102*a* and the left cover coupling portion 102*b*.

The fan module mounting portion 110 can include a first fixing portion 112 and a second fixing portion 114.

The first fixing portion 112 and the second fixing portion 114 can support top and bottom surfaces of the fan modules 16 and 17. The first fixing portion 112 and the second fixing portion 114 can be ribs protruding forward from the front surface of the mask body 10.

In some implementations, each of the first fixing portion 112 and the second fixing portion 114 is illustrated as being the fixing rib having the rib shape. The implementations are not limited to the illustrated. For example, each of the first fixing portion 112 and the second fixing portion 114 can include one or plurality of support protrusions protruding from the front surface of the mask body 10. That is, the first fixing portion 112 and the second fixing portion 114 can be understood as including protruding structures capable of supporting the top and bottom surfaces of the fan modules 16 and 17.

The air duct 120 can be disposed at one side from the fan module mounting portion 110 toward a center of the mask body 10, and fan module coupling portions 116 and 118 for fixing portions of the fan modules 16 and 17 can be disposed at the other side toward a side end of the mask body 10.

A portion of the bottom surface of the fan module mounting portion 110 on which the rear surfaces of the fan modules 16 and 17 are mounted can be recessed to a predetermined depth to reduce a weight of the mask body 10.

The fan module mounting portion 110 can include a cable fixing rib 113. The cable fixing rib 113 can include a first rib protruding from at least one of the first fixing portion 112 and the second fixing portion 114 and a second rib protruding from the front surface of the mask body 10.

In detail, the first rib can protrude upward or downward from a top surface of the first fixing portion 112 or a bottom surface of the second fixing portion 114 to extend by a predetermined length in a width direction of the mask body 10.

Also, the second rib can extend by a predetermined length in the width direction of the mask body 10 at a point spaced laterally from the first rib.

The cable fixing rib 113 can be provided to fix a cable extending from the fan modules 16 and 17 toward the control module 18 and the power module 19.

Since the fan modules 16 and 17 and the power module 19 are separated from the control module 18, a cable may electrically connect the modules to each other. For example, the cable can include a power cable and a signal cable.

If the cable is not fixed or does not adhere to the mask body 10, disconnection of the cable can occur, or noise can be generated when the cable collides with the mask body 10. Thus, a cable fixing rib 113 can be provided to firmly fix the cable.

The cable can extend along an outer edge of the fan module mounting portion 110 to avoid interference with the fan modules 16 and 17 mounted on the fan module mounting portion 110 from occurring.

Particularly, the cable extending from the power module 19 and the fan modules 16 and 17 extends to a space between the second rib and the first fixing portion 112 (or the second fixing portion 114). Also, the cable can cross the spaced space between the first rib and the second rib to extend to the space between the first rib and the front surface of the mask body 10 so as to be connected to the control module 18.

The fan module coupling portions 116 and 118 can be provided in plurality. The fan module coupling portions 116 and 118 can be disposed at the other sides of the fan modules 16 and 17 mounted on the fan module mounting portion 110, and a coupling member can be coupled to each of the fan module coupling portions 116 and 118.

The coupling member can be coupled to the fan module coupling portions 116 and 118 after passing through edges of the fan modules 16 and 17. The fan module coupling portions 116 and 118 can protrude from the front surface of the mask body 10.

Each of the fan module coupling portions 116 and 118 can have a coupling hole through which the coupling member is coupled. Alternatively, the fan module coupling portions 116 and 118 can be provided as a plurality of coupling ribs, and a space defined between the plurality of coupling ribs can function as a coupling hole. In the drawings, the fan module coupling portions 116 and 118 are indicated to be provided as a plurality of coupling ribs. The plurality of coupling ribs can be disposed to be spaced apart from each other so that the coupling member is coupled between the plurality of coupling ribs.

In some examples, the members 116 and 118 can be defined as the fan module coupling portions 116 and 118, one coupling portion 116, and the other coupling portion 118 in consideration of coupling by a coupling member. In some examples, the members 116 and 118 can be defined as "fan module combining portions," "one combining portion," and "the other combining portion" in consideration of coupling by press-fitting.

Each of the fan module coupling portions 116 and 118 can include an inclined surface that is inclined toward the center of the mask body 10. The inclined surface can be defined on one end of each of the fan module coupling portions 116 and 118. When the fan modules 16 and 17 are mounted on the fan module mounting portion 110 while moving in a direction toward the center of the mask body 10 from both side ends of the mask body 10, the inclined surface can perform a function of guiding the moving direction of the fan modules 16 and 17. That is, the fan modules 16 and 17 can be slid along the inclined surfaces in the direction of the center of the mask body 10 so as to be seated on the fan module mounting portion 110.

In the case in which the fan module coupling portions 116 and 118 are provided as the plurality of coupling ribs, when the coupling member is coupled, the plurality of coupling ribs can receive force to be spread in a direction away from each other. In some implementations, front ends of the plurality of coupling ribs can be connected to each other. Also, the coupling member can pass through a connection portion connecting the plurality of coupling ribs to each other.

The mask body 10 can include the air duct 120.

The air duct 120 can be provided at one side of the fan module mounting portion 110. When the fan modules 16 and 17 are mounted on the fan module mounting portion 110, one end of the fan module 16 and 17 can be connected to the air duct 120, and the other end can be fixed to the fan module coupling portions 116 and 118. An outlet of each of the fan modules 16 and 17 is provided at one end of each of the fan modules 16 and 17.

The air duct 120 can include a first air duct 120*a* disposed at the right side with respect to the center of the mask body 10 and a second air duct 120*b* disposed at the left side.

The air duct 120 can protrude further forward than the front surface of the mask body 10.

One end (suction end) of the air duct 120 can communicate with the outlets of the fan modules 16 and 17 so that air suctioned by the fan modules 16 and 17 flows along the air duct 120 so as to be supplied to the breathing space S through the air outlet 129 provided in the other end (discharge end) of the air duct 120.

That is, the air discharged to the breathing space S by the fan modules 16 and 17 flows toward the center of the mask body 10 from both sides of the mask body 10 and then is supplied to the user's nose or mouth.

The air duct 120 can be constituted by a front surface portion provided on the front surface of the mask body 10, a top surface portion connecting to an upper end of the front surface portion to the front surface of the mask body 10, a bottom surface portion connecting a lower end of the front surface portion to the front surface of the mask body 10, and an opened side surface portion. The opened side surface portion can be understood as a suction end of the air duct 120.

In some implementations, a portion of the rear surface portion of the air duct 120 can be covered by the bracket insertion portion 306 of the sealing bracket 30, and the remaining portion of the rear surface portion, which is not covered, can be defined as the air outlet 129.

The front surface portion of the air duct 120 can be constituted by a flat portion and a curved portion 121. The flat portion can be defined as the control module mounting portion 128.

In detail, the curved portion 121 constitutes a portion of the front surface portion and can guide the flow direction of the air supplied from the fan modules 16 and 17 to the breathing space.

An uneven portion 122 can be disposed on a rear surface of the flat portion (or control module mounting portion) 128, and the uneven portion 122 can be understood as a plurality of protrusions and grooves, or convex and concave portions, which extend from an upper end to a lower end of a rear surface of the flat portion 128 and are alternately arranged in the width direction (a direction crossing or perpendicular to the flow direction of the air) of the flat portion 128.

The air discharged from the fan modules 16 and 17 can pass through the air duct 120 and be introduced into the breathing space. In detail, the air discharged from the fan modules 16 and 17 can flow in a laminar flow manner between the curved portion 121 and the bracket insertion portion 306.

The air passing between the curved portion 121 and the bracket insertion portion 306 can flow in the laminar flow manner due to a flow velocity of air forcedly flowing by the fan modules 16 and 17. The air flowing in the laminar flow manner can be converted into a turbulent flow while passing through the uneven portion 122 of the flat portion 128. The air converted from the laminar flow to the turbulent flow by the uneven portion 122 can pass through the air outlet 129 and be discharged into the breathing space. When the air flow is converted from the laminar flow into the turbulent flow by the uneven portion 122, noise can be reduced while the flow rate of the air supplied to the breathing space S through the air outlet 129 increases.

The air duct 120 can include a division portion 124. The division portion 124 can protrude from a rear surface of the front surface portion extend in a flow direction of the suctioned air. Also, a plurality of divided portions 124 can be spaced apart from each other in the vertical direction of the flat portion 128.

The air duct 120 can include a fan module support 126. The fan module support 126 can be disposed on each of a top surface and a bottom surface of the air duct 120, respectively. The top and bottom surfaces of the air duct 120 can be connected to the first fixing portion 112 and the second fixing portion 114. The fan module support 126 can be provided so that a portion of the top and bottom surfaces of the air duct 120 is recessed or stepped in a direction toward the inner space of the air duct 120.

The fan module support 126 can perform a function of supporting one side of each of the fan modules 16 and 17. The fan modules 16 and 17 can be slid toward the air duct 120 until one side of each of the fan modules 16 and 17 is hooked by the fan module support 126, and the other sides of the fan modules 16 and 17 can be fixed by the fan module coupling portions 116 and 118, respectively.

The fan module support 126 also perform a function of supporting the bracket insertion portion 306 mounted on the mask body 10. When the bracket insertion portion 306 covers the rear surface of the mask body 10, specifically, one side of the cutoff portion defining the rear surface of the air duct 120, the bracket insertion portion 306 can be hooked and supported by the fan module support 126. Thus, the fan module support 126 can be defined as a bracket support.

The battery mounting portion 140 can be disposed at the center of the mask body 10 to serve as a center of gravity of the mask body 10.

The air discharge portion 150 provided in a lower side of the front surface of the mask body 10 can define a flow space for discharging air to an external space.

The air discharge portion 150 can include an upper side surface 150*a*, a lower side surface 150*c*, and both side surfaces 150*b*. The upper side surface 150*a*, the lower side surface 150*c*, and both side surfaces 150*b* can protrude forward from the front surface of the mask body 10. The lower side surface 150*c* can be defined by a rib extending forward from the lower front side of the mask body 10.

The upper side surface 150*a* defines a top surface of a flow space, the lower side surface 150*c* defines a bottom surface of the flow space, and both side surfaces 150*b* define both side surfaces of the flow space.

A front surface of the flow space is covered by the mask body cover 20, and a rear surface of the flow space is defined by the mask body 10.

A first air exhaust hole 154 is provided in a portion of the mask body 10 defining the rear surface of the flow space, and a second air exhaust hole 155 is provided in the lower side surface 150*c* defining the bottom surface of the flow space.

The mask body cover 20 can include a support rib 204.

The support rib 204 can protrude backward from the rear surface of the mask body cover 20. The support rib 204 can be supported by contacting the first bracket coupling portion 103 disposed on the mask body 10. The support rib 204 can be provided to reinforce strength of the mask body 10 or the mask body cover 20. That is, the inner space can be maintained between the mask body cover 20 and the mask body 10, and simultaneously, deformation in shape of the mask body cover 20 due to the external force can be minimized.

The mask body cover 20 can include a second body fixing portion 206.

The second body fixing portion 206 can be provided below the rear surface of the mask body cover 20. The second body fixing portion 206 can be provided in number and position corresponding to the second cover coupling portion 106. The second body fixing portion 206 is provided in a hook shape and can be coupled to the second cover coupling portion 106.

The mask body cover 20 can include a check valve cover 250. The check valve cover 250 can be disposed inside the air discharge portion 150 of the mask body 10. The check valve cover 250 and the air discharge portion 150 can be coupled to each other in a front and rear direction of the mask apparatus 1.

In some implementations, the check valve can be provided in the flow space defined between the first air exhaust hole 154 and the second air exhaust hole 155.

For example, the check valve having the form of a flat flap with a size and shape corresponding to the size and shape of the first air exhaust hole 154 can be provided.

In detail, an upper end of the flap can be connected to an upper edge of the first air exhaust hole 154, and when the user exhales, the flap can be bent or rotates to open the first air exhaust hole 154, and when the user inhales, the flap can be in close contact with the first air exhaust hole 154 to block the external air or the discharged air being introduced again into the breathing space.

When the mask body cover 20 is coupled to the mask body 10, the check valve cover 250 is inserted into the air discharge portion 150 to press an upper end of the check valve. Then, the check valve can be firmly fixed to an upper edge of the first air exhaust hole 154.

The check valve cover 250 can include a main cover 250*a* and an auxiliary cover 250*b*.

The main cover 250*a* can protrude from a rear surface of the mask body cover 20 toward the mask body 10, and the auxiliary cover 250*b* can protrude from edges of both side ends of the main cover 250*a* to extend downward. The auxiliary cover 250*b* can be understood as a reinforcing rib for helping to prevent the main cover 250*a* from being damaged by external force in a vertical direction. A protruding length of the main cover 250*a* is greater than that of the auxiliary cover 250*b*.

A plurality of reinforcing ribs for reinforcing strength of the main cover 250*a* can be disposed on a top surface of the main cover 250*a*. Since the check valve cover 250 is inserted into the flow space defined by the air discharge portion 150, an occurrence of a gap between the air discharge portion 150 and the check valve cover 250 can be minimized.

Figure 11:
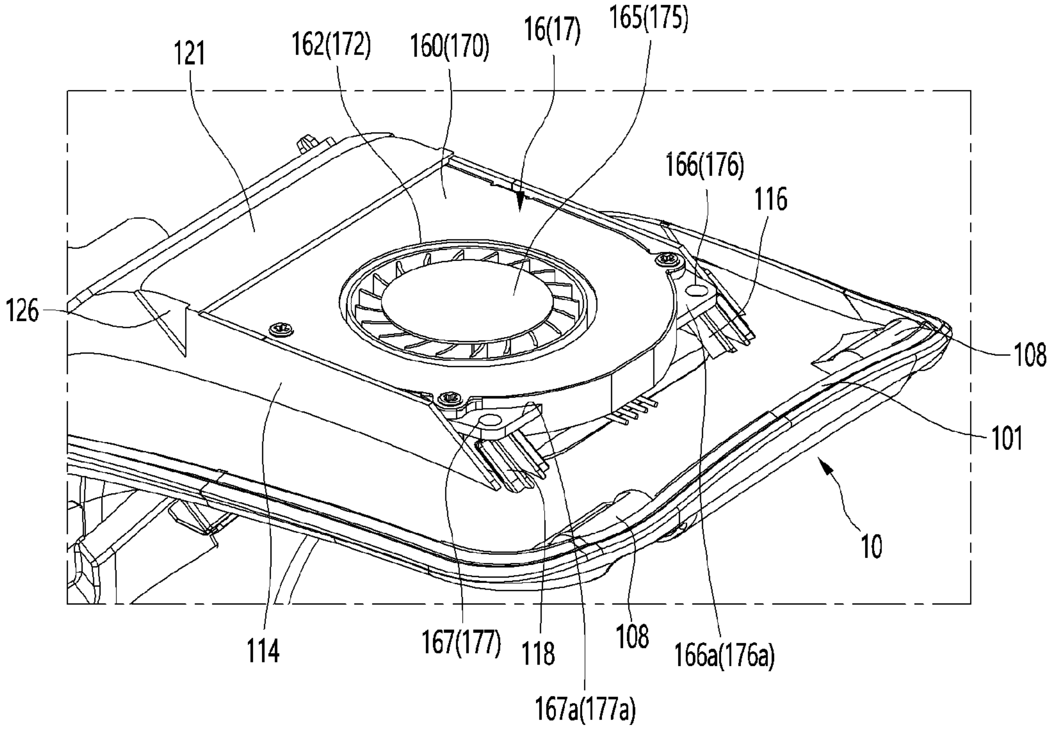
FIG. 11 is an enlarged perspective view illustrating an example of a fan module mounted on the mask body.
Figure 12:
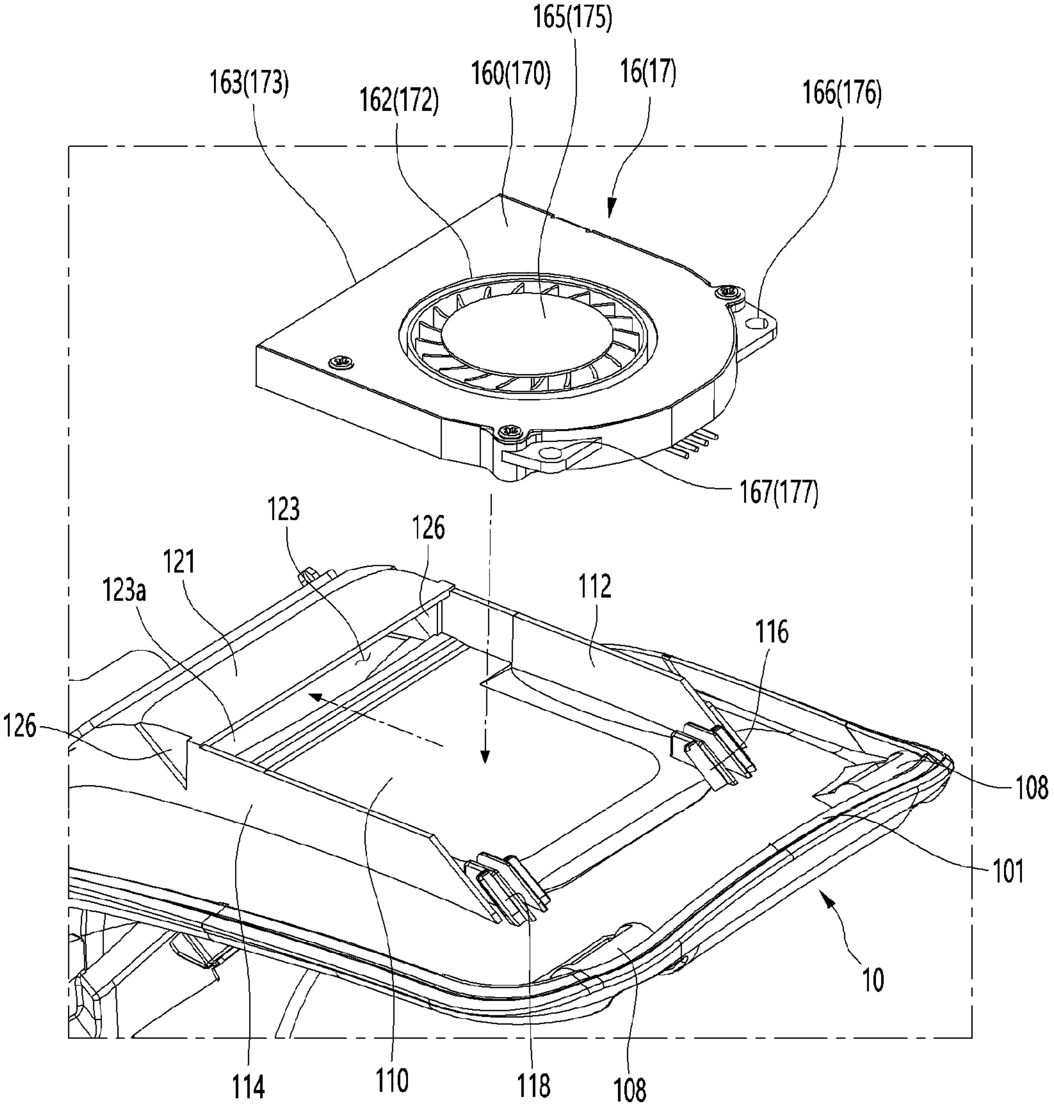
FIG. 12 is an exploded perspective view illustrating the fan module separated from the mask body.

FIG. 11 is an enlarged perspective view illustrating an example of a fan module mounted on the mask body, FIG. 12 is an exploded perspective view illustrating the fan module separated from the mask body, and FIG. 13 is a cross-sectional view of the mask apparatus, taken along line 13-13 of FIG. 1.

Referring to FIGS. 11 to 13, the fan modules 16 and 17 can be fixed to the fan module mounting portion 110 disposed on the mask body 10. Hereinafter, that the fan modules 16 and 17 are fixed to the fan module mounting portion 110 will be described in detail.

The fan modules 16 and 17 can include fans 165 and 175 and fan housings 160 and 170 accommodating the fans 165 and 175. The fan modules 16 and 17 include a first fan module 16 mounted on the first fan module mounting portion 110 and a second fan module 17 mounted on the second fan module mounting portion 110.

The fans 165 and 175 can rotate by receiving power by a fan motor. In some implementations, each of the fans 165 and 175 can include a centrifugal fan, but is not limited thereto. For example, each of the fans 165 and 175 can include an axial fan, a cross-flow fan, or other types of fans. The fans 165 and 175 and the fan motor can be accommodated inside the fan housings 160 and 170.

The fan housings 160 and 170 can include fan inlets 162 and 172 and fan outlets 163 and 173. When the fan housings 160 and 170 defines a surface, on which the fan module mounting portion 110 is seated, as a rear surface or a bottom surface, the fan inlets 162 and 172 can be provided in the front or top surfaces of the fan housings 160 and 170, and the fan outlets 163 and 173 can be provided in side surfaces of the fan housings 160 and 170.

When the mask body cover 20 is coupled to the mask body 10 in a state in which the fan modules 16 and 17 are seated on the fan module mounting portion 110, the fan inlets 162 and 172 of the fan housings 160 and 170 can communicate with the air suction holes 211 and 221 of the filter mounting portions 21 and 22. The fan outlets 163 and 173 of the fan housings 160 and 170 can communicate with a suction end of the air duct 120, i.e., the fan module insertion hole 123.

A pair of coupling ends can be disposed on side surfaces of the fan housings 160 and 170, specifically, side surfaces opposite to the fan outlets 163 and 173. The coupling ends can include one coupling end 166*a* and 176*a* and the other coupling end 167*a* and 177*a*, which are disposed at positions symmetrical to each other about a vertical surface bisecting the fan housings 160 and 170. A coupling hole can be defined in each of the coupling ends, and the coupling holes can include one coupling holes 166 and 176 defined in one-side coupling ends 166*a* and 176*a* and the other coupling hole 167 and 177 defined in the other-side coupling ends 167*a* and 177*a*. The coupling members passing through the one-side coupling holes 166 and 176 and the other-side coupling holes 167 and 177 can be respectively inserted into the one coupling portion 116 and the other coupling portion 118.

Hereinafter, a method of mounting the fan modules 16 and 17 to the fan module mounting portion 110 will be described in detail.

To mount the fan modules 16 and 17 on the fan module mounting portion 110, the fan modules 16 and 17 can be inserted between the first fixing portion 112 and the second fixing portion 114. The top and bottom surfaces of the fan modules 16 and 17 can be supported by the first fixing portion 112 and the second fixing portion 114.

The fan modules 16 and 17 inserted between the first fixing portion 112 and the second fixing portion 114 can be slid in a direction toward the air duct 120. A fan module insertion hole 123 for inserting the fan modules 16 and 17 can be defined in the inlet side of the air duct 120.

The fan module insertion hole 123 can have a size corresponding to each of the fan modules 16 and 17 and can be defined as an opened side of the air duct 120.

A portion of the side surface of each of the fan modules 16 and 17 can be inserted until the side surfaces of the fan modules 16 and 17, in which the fan outlets 163 and 173 are provided, contact the fan module support 126.

The fan module insertion hole 123 can be defined in an opened end of the air duct 120, i.e., the inlet of the air duct 120. The plurality of surfaces defining the fan module insertion hole 123 are in close contact with the front, rear, upper side, and lower side surfaces of the fan housings 160 and 170.

Particularly, the rear surface of the fan module insertion hole 123, which are contact with the rear surfaces of the fan housings 160 and 170, can define the inclined surface 123*a* (see FIG. 13A).

The inclined surface 123*a* can be provided to be inclined toward the center of the fan module insertion hole 123 toward the insertion direction of the fan modules 16 and 17. Thus, when the fan modules 16 and 17 are slid toward the fan module insertion hole 123, the rear surfaces of the fan modules 16 and 17 can move along the inclined surface 123*a* to allow the fan module 16 and 17 to be stably inserted into the fan module insertion hole 123 without shaking.

A recessed surface 123*b* (see FIG. 13B) or a stepped surface can be disposed at an end of the air duct 120, which defines the fan module insertion hole 123.

In detail, the recessed surface 123*b* or the stepped surface can be disposed on the rear surface of the air duct 120 facing the inclined surface 123*a*.

When the front side ends of the fan modules 16 and 17 are hooked with the recessed surface 123*b*, the insertion of the fan modules 16 and 17 can be completed, and the gap between the front surface of each of the fan modules 16 and 17 and the air duct 120 can be reduced or eliminated.

Also, since the recessed surface 123*b* is disposed at a point facing the inclined surface 123*a*, the front surfaces of the fan modules 16 and 17 moving along the inclined surface 123*a* can further be in close contact with the recessed surface 123*b*.

That is, the fan modules 16 and 17 inserted into the fan module insertion hole 123 move toward the fan module support 126 disposed inside the air duct 120. Then, the fan modules 16 and 17 can contact the fan module support 126 and be fixed inside the air duct 120. Also, the fan modules 16 and 17 are in close contact with the inlet of the air duct 120 by the fan module support 126, the inclined surface 123*a*, and the recessed surface 123*b* to reduce or eliminate the gap between the fan outlets 163 and 173 of the fan modules 16 and 17 and the outlet of the air duct 120.

When one side of the fan module 16 and 17 is fixed to the fan module insertion hole 123, the one-side coupling holes 166 and 176 and the other-side coupling holes 167 and 177 of the fan housings 160 and 170 can be disposed on the fan module coupling portion 116 and 118.

When the coupling member passes through the one-side coupling holes 166 and 176 and the other-side coupling holes 167 and 177 and is inserted into the fan module coupling portions 116 and 118, a process of fixing the fan modules 16 and 17 to the fan module mounting portion 110 is completed.

In the state in which the fan modules 16 and 17 are mounted on the fan module mounting portion 110, an edge portion of the mask body cover 20 can be inserted into the cover coupling groove 101 of the mask body 10 to couple the mask body 10 to the mask body cover 20.

When the mask body cover 20 and the mask body 10 are coupled to each other, the filter mounting portions 21 and 22 of the mask body cover 20 are in close contact with the front surfaces of the fan modules 16 and 17. When the filter mounting portions 21 and 22 and the fan modules 16 and 17 contact each other, the air suction holes 211 and 221 and the fan inlets 162 and 172 of the fan modules 16 and 17 communicate with each other.

Filters 23 and 24 can be disposed inside the filter mounting portions 21 and 22, and filter covers 25 and 26 covering the filters 23 and 24 can be mounted on opened front surfaces of the filter mounting portions 21 and 22. The air inlets 251 and 261 can be defined in side surfaces of the filter covers 25 and 26 so that external air is introduced into the filter mounting portions 21 and 22.

Hereinafter, a process of supplying filtered air to a breathing space will be described in detail.

First, the fan modules 16 and 17 of the mask apparatus 1 can operate to generate a flow of air.

The external air introduced through the air inlets 251 and 261 can be introduced into inflow spaces 215 and 225 defined between the filter covers 25 and 26 and the filter mounting portions 21 and 22. The external air introduced into the inflow space passes through the filters 23 and 24 disposed inside the inflow spaces 215 and 225 and then is guided to the air suction holes 211 and 221.

The air guided through the air suction holes 211 and 221 is suctioned into the fan inlets 162 and 172 of the fan modules 16 and 17 communicating with the air suction holes 211 and 221. The air suctioned through the fan inlets 162 and 172 can be discharged to the fan outlets 163 and 173 of the fan modules 16 and 17 so as to be guided to the inlet of the air duct 120.

The air duct 120 can guide the air discharged from the fan outlets 163 and 173 to the air outlet 129 of the mask body 10. The air discharged from the fan outlets 163 and 173 can be guided toward the air outlet 129 by the curved portion 121 of the air duct 120, and an air flow characteristic can be converted from a laminar flow to a turbulent flow and then be discharged to the air outlet 129.

The air flow characteristic can be converted by the air duct 120 to reduce discharge noise of the air discharged to the air outlet 129 and increase in flow amount of air.

In the air duct 120, the air discharged from the fan outlets 163 and 173 of the fan modules 16 and 17 can flow along a plurality of flow paths divided by the plurality of division portions 124. As a result, a pressure of the air supplied to the user's nose and mouth can be uniform.

In some implementations, one side of each of the fan modules 16 and 17 can be inserted into the air duct 120, and the other side of each of the fan modules 16 and 17 can be coupled to each of the fan module coupling portions 116 and 118. Therefore, the fan modules 16 and 17 can be stably coupled to the mask body 10 without shaking.

In some implementations, the other side of each of the fan modules 16 and 17 can be coupled by the coupling member. In some implementations, the other side of each of the fan modules 16 and 17 can be press-fitted into the fan module coupling portions 116 and 118.

In the state in which the other sides of the fan modules 16 and 17 are coupled to the fan module coupling portions 116 and 118, disassembly of the fan modules 16 and 17 is impossible. As a result, when the coupling between the other sides of the fan modules 16 and 17 and the fan module coupling portions 116 and 118 are released, the fan modules 16 and 17 can be separable.

Since the top and bottom surfaces of the fan modules 16 and 17 are supported by the first fixing portion 112 and the second fixing portion 114, the fan modules 16 and 17 can be stably slid to move toward the air duct 120, and the mounting of the fan modules 16 and 17 can be simplified.

Since the air discharged from the fan modules 16 and 17 toward the air outlet 129 is converted in flow characteristic from the laminar flow to the turbulent flow, the air discharged from the air outlet 129 to the breathing space S can be reduced in discharge noise, and an amount of discharged air can increase.

In some implementations, since the cable fixing rib 113 for fixing the cable extending from the fan modules 16 and 17 is provided, the interference with the cable and other components can be avoided, and the cable can be in close contact with the mask body 10 so as to be stably fixed.

What is claimed is:

1. A mask apparatus comprising:

a mask body comprising an air duct disposed at a front surface of the mask body, and a fan module mounting portion disposed at a suction-side of the air duct;

a fan module disposed at the fan module mounting portion, the fan module defining a fan inlet and a fan outlet that are configured to communicate air with the air duct; and a mask body cover that is coupled to the front surface of the mask body and covers the fan module and the air duct, the mask body cover defining an air suction hole configured to communicate air with the fan inlet, wherein the fan module has a first end inserted into the air duct and a second end coupled to the mask body, and wherein the fan module mounting portion comprises a fan module coupling portion that protrudes from the front surface of the mask body and that couples the second end of the fan module to the mask body, wherein the fan module comprises:

a fan, a fan motor configured to drive the fan, and a fan housing that accommodates the fan and the fan motor, wherein the fan inlet is defined at a front surface of the fan housing, and the fan outlet is defined at a side surface of a first end of the fan housing, wherein the air duct comprises:

a fan module insertion hole that receives the first end of the fan housing, and an air outlet configured to discharge air supplied from the fan module insertion hole, and wherein the fan housing comprises a coupling end that extends from a second end of the fan housing, the coupling end defining a coupling hole that receives a coupling member to be inserted into the fan module coupling portion.

2. The mask apparatus according to claim 1, wherein the fan module mounting portion further comprises a pair of fixing portions that protrude from the front surface of the mask body, the pair of fixing portions supporting a top surface of the fan module and a bottom surface of the fan module, respectively.

3. The mask apparatus according to claim 2, wherein each of the pair of fixing portions has a rib shape and is configured to guide horizontal sliding movement of the fan module in a direction perpendicular to the fan module insertion hole, the pair of fixing portions comprising:

a first fixing portion that extends along an upper edge of the fan module insertion hole, and a second fixing portion that extends along a lower edge of the fan module insertion hole.

4. The mask apparatus according to claim 2, wherein the fan module coupling portion is disposed at an end of each of the pair of fixing portions, and defines an inclination surface.

5. The mask apparatus according to claim 1, wherein the air duct comprises a recess surface that is disposed at an end of the air duct, that faces the first end of the fan housing, and that defines a front portion of the fan module insertion hole.

6. The mask apparatus according to claim 5, wherein the air duct further comprises a rear surface and an inclination surface that define a rear portion of the fan module insertion hole, the rear surface of the air duct contacting a rear surface of the fan housing, and wherein the inclination surface of the air duct extends along an insertion direction of the fan module toward a center of the fan module insertion hole.

7. The mask apparatus according to claim 2, further comprising:

a power module mounting portion disposed at the front surface of the mask body and disposed between the fan module mounting portion and a lateral end of the mask body; and a power module disposed at the power module mounting portion.

8. The mask apparatus according to claim 7, further comprising a cable fixing rib configured to support one or more cables connected to at least one of the fan module or the power module, the cable fixing rib comprising:

a first rib disposed at at least one of the pair of fixing portions; and a second rib disposed at the front surface of the mask body and spaced apart from the first rib and the one of the pair of fixing portions.

9. The mask apparatus according to claim 8, wherein the first rib protrudes from the one of the pair of fixing portions in a first direction, wherein the second rib protrudes from the front surface of the mask body in a second direction crossing the first direction, and wherein the first rib and the second rib extend along one direction.

10. The mask apparatus according to claim 1, wherein the air duct comprises:

a front surface portion;

a top surface portion that connects an upper end of the front surface portion to the front surface of the mask body; and a bottom surface portion that connects a lower end of the front surface portion to the front surface of the mask body, and wherein the front surface portion comprises:

a curved portion that extends from the fan module insertion hole, a flat portion that connects an end of the curved portion to the front surface of the mask body, and an uneven portion disposed at a rear surface of the flat portion.

11. The mask apparatus according to claim 10, further comprising:

a seal configured to contact a user's face; and a sealing bracket that fixes the seal to a rear surface of the mask body.

12. The mask apparatus according to claim 11, wherein the mask body defines a cutoff portion at the rear surface of the mask body, wherein a part of the cutoff portion corresponds to the air outlet, wherein the sealing bracket comprises a bracket insertion portion that covers a first area of the cutoff portion, and wherein the air outlet is a second area of the cutoff portion outside the bracket insertion portion.

13. The mask apparatus according to claim 12, wherein the mask body cover comprises a filter mounting portion that defines the air suction hole and that is recessed from a front surface of the mask body cover.

14. The mask apparatus according to claim 13, further comprising:

a filter configured to be inserted to the filter mounting portion; and a filter cover configured to cover a front opening of the filter mounting portion.

15. The mask apparatus according to claim 14, wherein each of the air duct and the fan module mounting portion is disposed at both of left and right sides with respect to a center of the mask body, and wherein each of the filter mounting portion and the filter cover is disposed at both of left and right sides with respect to a center of the mask body cover.

16. The mask apparatus according to claim 15, wherein the filter cover defines one or more air inlets at a side surface of the filter cover.

17. The mask apparatus according to claim 10, further comprising a control module disposed at the flat portion of the air duct.

18. A mask apparatus comprising:

a mask body comprising a pair of air ducts that are respectively disposed at left and right sides with respect to a center of a front surface of the mask body, and a pair of fan module mounting portions that are respectively disposed at suction-sides of the pair of air ducts;

a pair of fan modules that are respectively disposed at the pair of fan module mounting portions, each of the pair of fan modules defining a fan inlet and a fan outlet that are configured to communicate air with each of the pair of air ducts; and a mask body cover that is coupled to the front surface of the mask body and covers the pair of fan modules and the pair of air ducts, the mask body cover defining air suction holes configured to communicate air with the fan inlets of the pair of fan modules, wherein each of the pair of fan modules has a first end inserted into a corresponding one of the pair of air ducts and a second end coupled to the mask body, and wherein each of the pair of fan module mounting portions comprises a fan module coupling portion that protrudes from the front surface of the mask body and that couples the second end of a corresponding one of the pair of fan modules to the mask body, wherein each of the pair of fan modules comprises:

a fan, a fan motor configured to drive the fan, and a fan housing that accommodates the fan and the fan motor, wherein the fan inlets of the pair of fan modules are defined at front surfaces of the fan housings, respectively, and the fan outlets of the pair of fan modules are defined at side surfaces of first ends of the fan housings, respectively, wherein each of the pair of air ducts comprises:

a fan module insertion hole that receives one of the first ends of the fan housings, and an air outlet configured to discharge air supplied from the fan module insertion hole, and wherein each of the fan housings comprises a coupling end that extends from one of second ends of the fan housings, the coupling end defining a coupling hole that receives a coupling member to be inserted into the fan module coupling portion of one of the pair of fan module mounting portions.

19. The mask apparatus according to claim 18, wherein the mask body cover comprises a pair of filter mounting portions that define the air suction holes and that are recessed from a front surface of the mask body cover.

20. The mask apparatus according to claim 19, further comprising:

a pair of filters configured to be inserted to the pair of filter mounting portions, respectively; and a pair of filter covers configured to cover front openings of the pair of filter mounting portions, respectively.

* * * * *